(12) United States Patent
Hasebe et al.

(10) Patent No.: US 7,360,790 B2
(45) Date of Patent: Apr. 22, 2008

(54) AIRBAG WITH TIE PANEL

(75) Inventors: Masahiro Hasebe, Shiga (JP); Yukitoshi Narimoto, Ohmihachiman (JP)

(73) Assignee: Takata Corporation, Tokyo (JP)

( * ) Notice: Subject to any disclaimer, the term of this patent is extended or adjusted under 35 U.S.C. 154(b) by 478 days.

(21) Appl. No.: 10/421,900

(22) Filed: Apr. 24, 2003

(65) Prior Publication Data

US 2003/0218325 A1 Nov. 27, 2003

(30) Foreign Application Priority Data

May 22, 2002 (JP) .............................. 2002-147960

(51) Int. Cl.
*B60R 21/16* (2006.01)
(52) U.S. Cl. .................................. 280/743.2
(58) Field of Classification Search ............. 280/743.2
See application file for complete search history.

(56) References Cited

U.S. PATENT DOCUMENTS

| | | | |
|---|---|---|---|
| 5,213,361 A | 5/1993 | Satoh et al. | |
| 5,308,113 A | 5/1994 | Moriset | |
| 5,730,464 A * | 3/1998 | Hill | 280/743.2 |
| 5,945,184 A | 8/1999 | Nagata et al. | |
| 6,042,147 A * | 3/2000 | Nishijima et al. | 280/743.1 |
| 6,164,696 A * | 12/2000 | Ellerbrok et al. | 280/743.2 |
| 6,296,276 B1 * | 10/2001 | Ritter | 280/743.2 |
| 6,398,253 B1 * | 6/2002 | Heigl | 280/743.2 |
| 6,726,245 B2 * | 4/2004 | Fellhauer et al. | 280/743.2 |
| 6,783,151 B2 * | 8/2004 | Rasch et al. | 280/743.2 |
| 2002/0105171 A1 | 8/2002 | Fellhauer et al. | |
| 2003/0230883 A1 | 12/2003 | Heym | |

FOREIGN PATENT DOCUMENTS

| | | |
|---|---|---|
| EP | 0 586 131 | 3/1994 |
| JP | 47-30045 | 11/1972 |
| JP | 49023176 B | 6/1974 |
| JP | 4-292239 | 10/1992 |
| JP | 9-132097 | 5/1997 |
| JP | 10-71911 | 3/1998 |
| JP | 11-321506 | 11/1999 |
| JP | 2000-118341 | 4/2000 |
| WO | WO02/02376 | 1/2002 |

* cited by examiner

*Primary Examiner*—Paul N. Dickson
*Assistant Examiner*—Joselynn Y. Sliteris
(74) *Attorney, Agent, or Firm*—Manabu Kanesaka

(57) ABSTRACT

An airbag for protecting an occupant in a vehicle includes a left half airbag to be inflated toward a front left side of the occupant; a right half airbag to be inflated toward a front right side of the occupant; and at least one tie panel for connecting the left and right half airbag. The left and right half airbags contact with each other when the airbag is inflated.

14 Claims, 15 Drawing Sheets

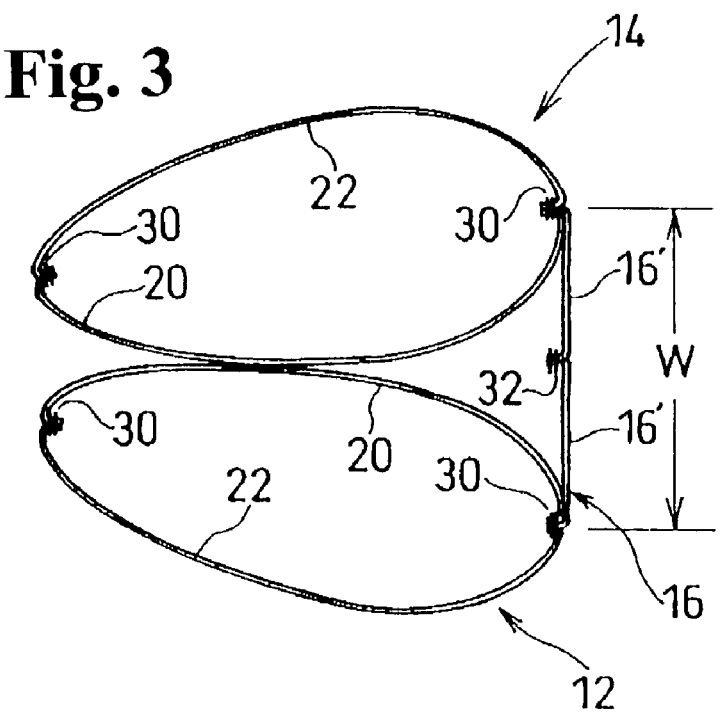
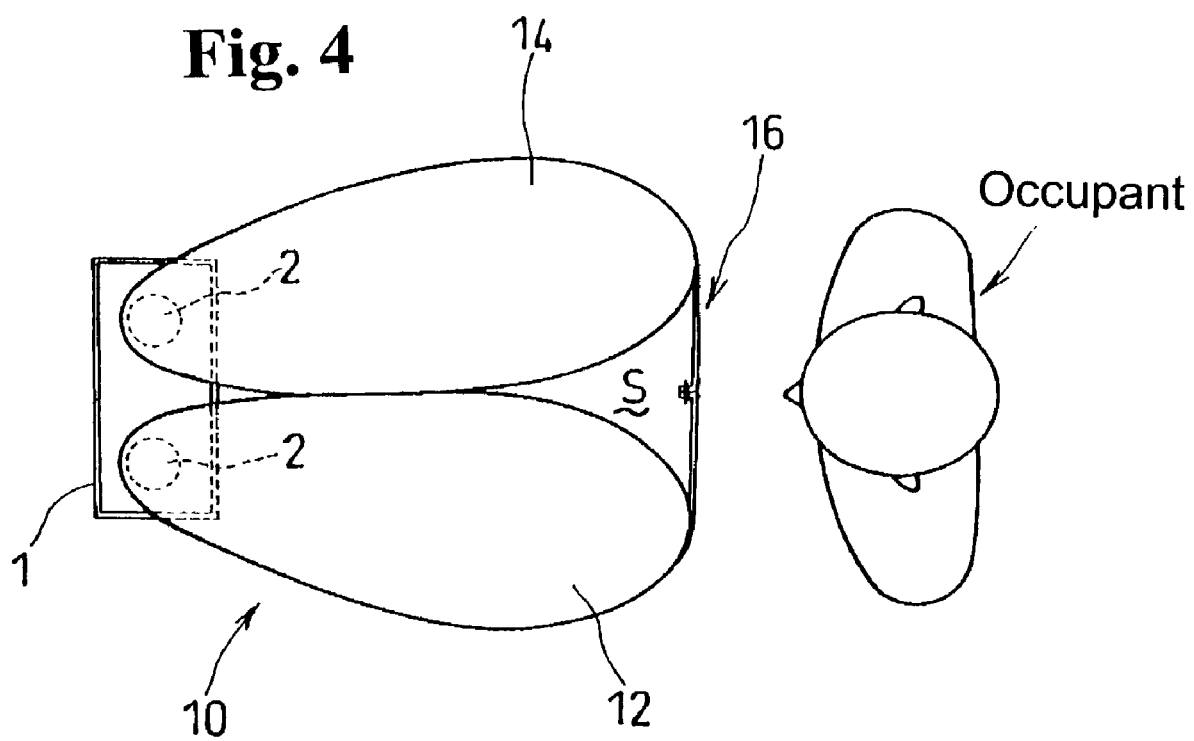

AIRBAG WITH TIE PANEL

BACKGROUND OF THE INVENTION AND RELATED ART STATEMENT

The present invention relates to an airbag for protecting an occupant in a vehicle in case of a vehicle collision, and, more particularly, relates to an airbag having a tie panel for connecting left and right half airbags at sides thereof facing the occupant.

Japanese Patent Publication (KOKAI) No. 47-30045 has disclosed an airbag with tie panels connecting left and right half airbags and occupant-side front ends thereof for protecting an occupant in a vehicle in case of a vehicle collision.

In the airbag disclosed in Japanese Patent Publication No. 47-30045, when the left and right half airbags are inflated, the bags are separated apart, thereby forming a large space over a whole area between the left and right half airbags. When such a large space is formed between the left and right half airbags (behind the tie panel) upon inflation of the airbag, and the occupant plunges into the tie panel, the occupant intrudes deep into the space to cause deformations of the left and right half airbags such as folding (buckling), thereby making it difficult to receive the occupant securely.

It is an object of the present invention to provide an airbag having a tie panel connecting left and right half airbags and occupant side front ends thereof, thereby securely receiving the occupant and sufficiently absorbing an impact applied to the occupant.

Further objects and advantages of the invention will be apparent from the following description of the invention.

SUMMARY OF THE INVENTION

According to the first aspect of the present invention, an airbag comprises a left half airbag to be inflated toward a front left side of an occupant, a right half airbag to be inflated toward a front right side of the occupant, and at least one tie panel connecting the left and right half airbag. It is constructed that the left and right half airbags contact with each other when the airbag is inflated.

In the airbag thus constructed, the left and right half airbags contact with each other, and a space behind the tie panel becomes small when the left and right half airbags are expanded. Therefore, when the occupant is plunged into the airbag, the airbag can receive the occupant safely without intruding excessively deep into the space.

In a case that a space is formed behind the tie panel, when the occupant is plunged into the tie panel, the tie panel retreats in an elastic manner with a tension smaller than an internal pressure of the airbag so as to receive the occupant relatively softly. Thus, an impact on the occupant at the moment when the occupant contacts the airbag becomes smaller.

According to the second aspect of the invention, in the airbag of the first aspect, it is preferable that the tie panel connects the left half airbag and the right half airbag at sides thereof facing the occupant. With this configuration, when the occupant is plunged into the airbag, the tie panel supports the occupant, thereby sufficiently reducing the impact applied to the occupant.

According to the third aspect of the invention, in the airbag of the second aspect, it is preferable that the tie panel connects the left half airbag and the right half airbag at front ends thereof facing the occupant. With this configuration in which the tie panel is provided at the front ends of the left and right half airbags, when the occupant is plunged into the airbag, the occupant contacts the tie panel first. Accordingly, the impact on the occupant becomes smaller at the moment when the occupant contacts the airbag. Since the tie panel absorbs kinetic energy of the occupant, the impact on the occupant becomes further smaller at the moment when the occupant contacts the airbag.

According to the fourth aspect of the invention, in the airbag of the second aspect, it is preferable that the tie panel includes an upper tie panel for connecting upper portions of the left half and the right half airbags at sides facing the occupant; and a lower tie panel for connecting lower portions of the left half and the right half airbags at sides facing the occupant. In this case, when the occupant is plunged into the inflated airbag, the upper tie panel is arranged to face a chest or head part of the occupant, and the lower tie panel is arranged to face an abdominal part of the occupant. When the chest or head and abdominal parts of the occupant contact the airbag, the upper and lower tie panels can receive the chest, head and abdominal parts relatively softly, thereby greatly reducing the impact applied to a brain or internal organs of the occupant.

Further, in the airbag of the second aspect, the tie panel may be respectively provided at a plurality of portions including front ends of the left and right half airbags and upper and lower portions of the airbags at the sides facing the occupant. Alternatively, the tie panel may be selectively provided at any portions of the left and right half airbags. Further, the tie panel may be provided at any portions at the sides facing the occupant other than those described above. The tie panels may be provided to fully extend at the upper to lower portions of the occupant facing side.

In the airbag of the present invention, it is preferable that a lateral width of the tie panel is 200 to 450 mm. With the tie panel having a 200 to 450 mm width, when the left and right half airbags are expanded, the tie panel connects the front ends of the airbags such that the front ends face the vicinity of both shoulders of an adult occupant having an average size, and the tie panels are arranged so as to face the head and abdominal parts of the occupant. Therefore, it is possible to hold the chest or head part and the abdominal part of the occupant with the tie panels having relatively large elasticity, thereby reducing the impact applied to the occupant due to the contact with the airbag. Furthermore, the left and right half airbags contact both shoulders of the occupant to securely receive the occupant.

In the airbag of the present invention, a connecting panel may be provided for connecting upper or lower portions of the left and right half airbags respectively or both. The connecting panel may have a lateral width so that the connecting panel is tensioned when the left and right half airbags are inflated.

With the structure thus constructed, when the occupant is plunged into the left and right half airbags, it is possible to prevent buckling deformation in which the left and right half airbags move apart at central portions in the front-to-rear direction.

BRIEF DESCRIPTION OF THE DRAWINGS

FIG. 3 is a sectional view taken along line 3-3 in FIG. 1;

FIG. 4 is a plan view of the airbag in FIG. 1 in a state where the airbag faces an occupant;

DETAILED DESCRIPTION OF PREFERRED EMBODIMENTS

Hereunder, preferred embodiments of the present invention will be described in detail with reference to the accompanying drawings.

Figure 1:
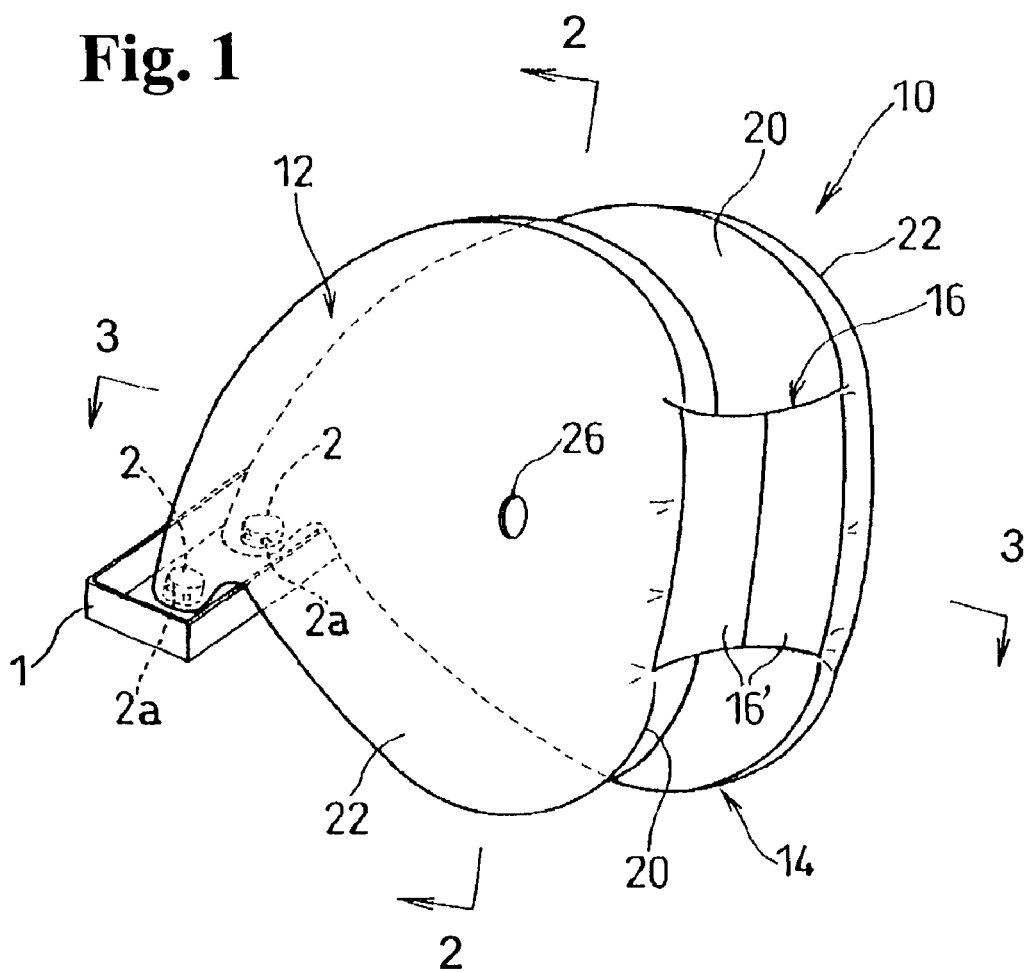
FIG. 1 is a perspective view of an airbag according to an embodiment of the present invention.
Figure 2:
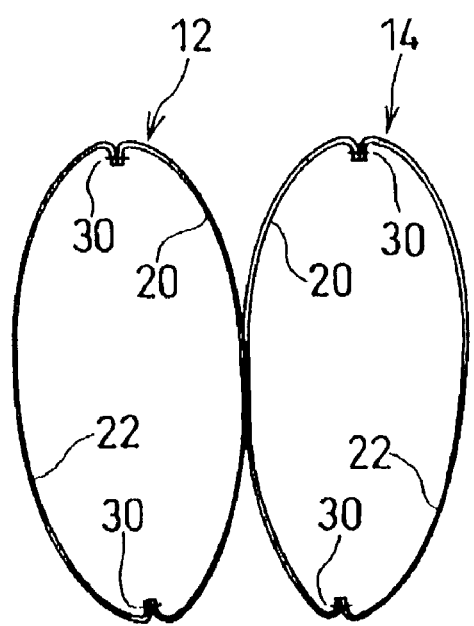
FIG. 2 is a sectional view taken along line 2-2 in FIG. 1.
Figure 5:
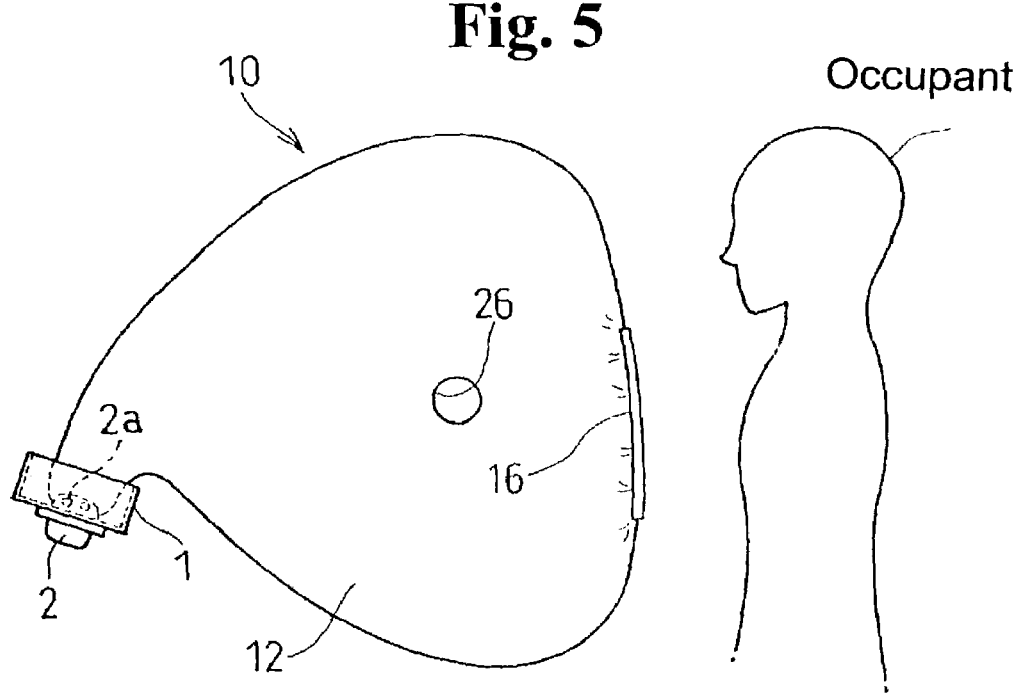
FIG. 5 is a side view of the airbag in FIG. 1 in a state where the airbag faces the occupant.

FIG. 1 is a perspective view showing an airbag according to an embodiment of the present invention in a state that the airbag is expanded. FIGS. 2 and 3 are sectional views taken along lines 2-2 and 3-3 in FIG. 1, respectively. FIGS. 4 and 5 are plan and side views of the airbag in a state where an adult occupant having an average size faces the airbag. FIGS. 6 to 11 are views for explaining a manufacturing process of the airbag according to the embodiment of the present invention. FIG. 12 is a perspective view showing an airbag apparatus having the airbag around a passenger seat in a vehicle in a state where the occupant faces the airbag. In the following description, left and right directions indicate the left and right directions of the occupant.

An airbag 10 comprises a left half airbag 12 to be inflated toward a front left side of the occupant, a right half airbag 14 to be inflated toward a front right side of the occupant, and a tie panel 16 connecting front ends of the left and right half airbags 12 and 14 at sides facing the occupant. The left and right half airbags 12 and 14 include an inflator opening 18 (refer to FIGS. 6 to 10) at a rear end opposite to the occupant.

The left and right half airbags 12 and 14 have inner panels 20 at sides where the airbags 12 and 14 face with each other, outer panels 22 opposite to the inner panels 20, and rear end panels 24 connected to rear ends of the inner and outer panels 20 and 22. The inflator opening 18 is provided in the rear end panel 24. Further, vent hole 26 (not shown in FIGS. 6 to 10) are provided in the outer panel 22.

Figure 6:
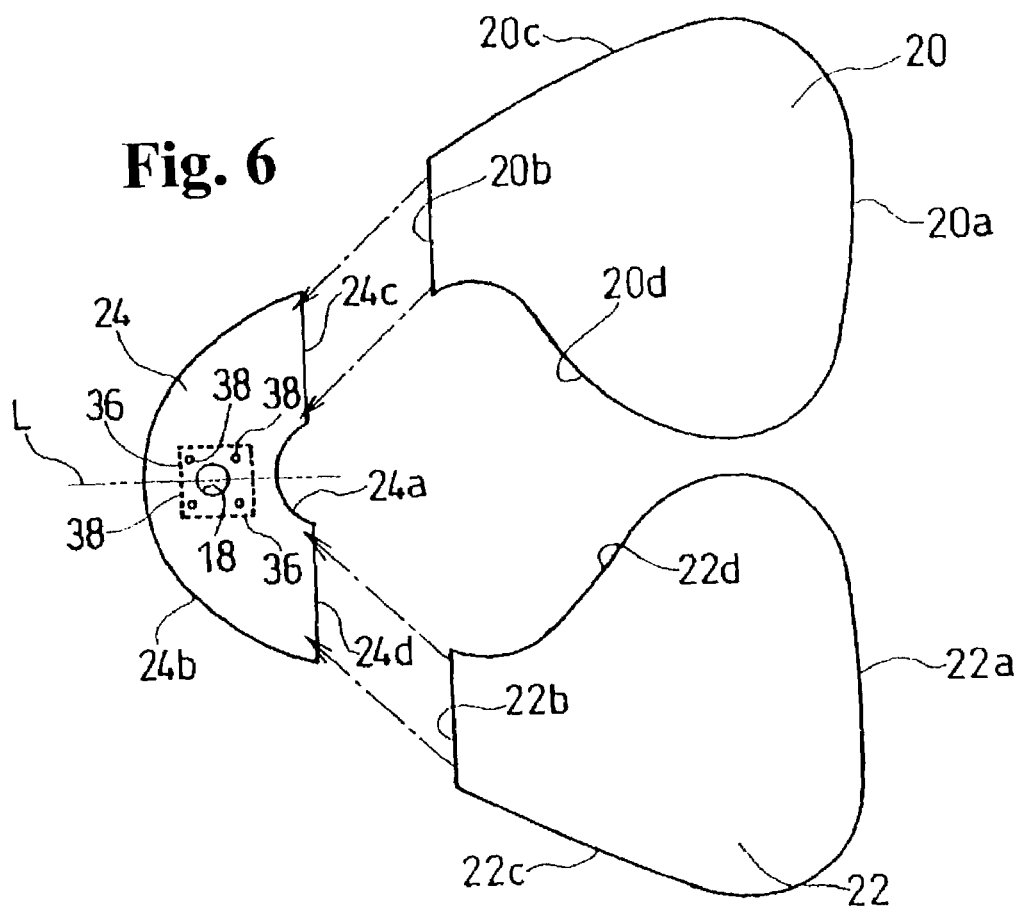
FIG. 6 is a view for explaining a manufacturing process of the airbag in FIG. 1.

As shown in FIG. 6, the inner and outer panels 20, 22 in each airbag include occupant-side front hems 20a and 22a extending substantially vertically, rear hems 20b and 22b opposite to the front hems 20a and 22a, and upper and lower hems 20c, 22c, 20d, 22d connecting both ends of the front hems 20a, 22a and the rear hems 20b, 22b, respectively. The rear hems 20b, 22b have a length shorter than that of the front hems 20a, 22a, and are formed in a substantially trapezoidal shape. Further, the rear end panel 24 is formed in a substantially half-ring shape, and is provided with inner and outer circumferential hems 24a and 24b formed in the semicircular shape and concentrically facing with each other, and both end hems 24c and 24d connecting both ends of the inner and outer circumferential hems 24a and 24b.

Further, the inner and outer panels 20 and 22 are constructed in a mirror image. The rear hems 20b and 22b of the inner and outer panels 20 and 22 have a length almost equal to that of both end hems 24c and 24d of the rear end panel 24.

The rear hems 20b and 22b of the inner and outer panels 20 and 22 are overlapped with both end hems 24c and 24d of the rear end panel 24, respectively. The rear hems are joined by sewing or the like such that the inner circumferential hem 24a of the rear end panel 24 is extended from the lower hems 20d and 22d of the inner and outer panels 20 and 22, and the outer circumferential hem 24b of the rear end panel 24 is extended from the upper hems 20c and 22c of the inner and outer panels 20 and 22. A reference numeral 28 in FIGS. 7 to 10 represents joining lines.

Figure 8:
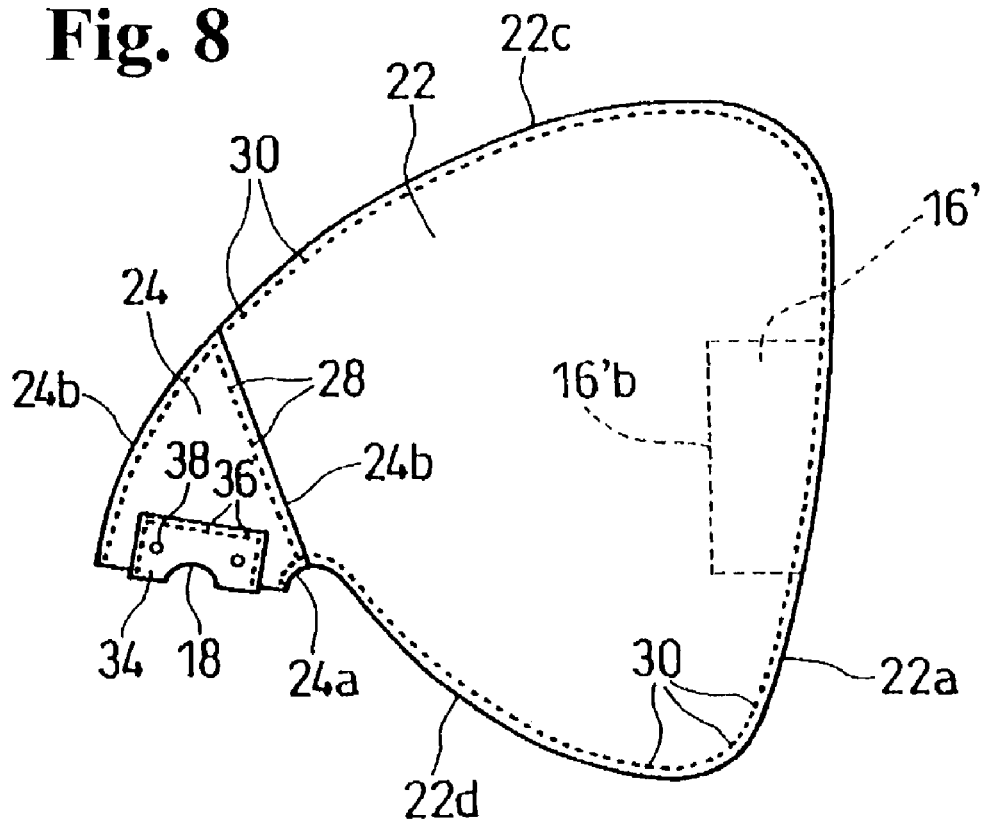
FIG. 8 is a view for explaining the manufacturing process of the airbag in FIG. 1.

The rear end panel 24 is folded along a folding line L (FIG. 6) connecting center portions of the inner and outer circumferential hems 24c and 24d in a circumferential direction, so that the inner and outer panels 20 and 22 are overlapped. After being folded, each of the bag-shaped airbags 12 and 14 is formed through sewing such portions as one half of the inner circumferential hem 24a and the other half thereof; one half of the outer circumferential hem 24b and the other half thereof; the upper hems 20c and 22c of the inner and outer panels 20 and 22; the lower hems 20d and 22d thereof; and the front hems 20a and 22a thereof. The joining operation is performed along a joining line 30 extending around substantially circumferential edges of each of the airbags 12 and 14 along the respective hems thereof (FIG. 8).

Figure 10:
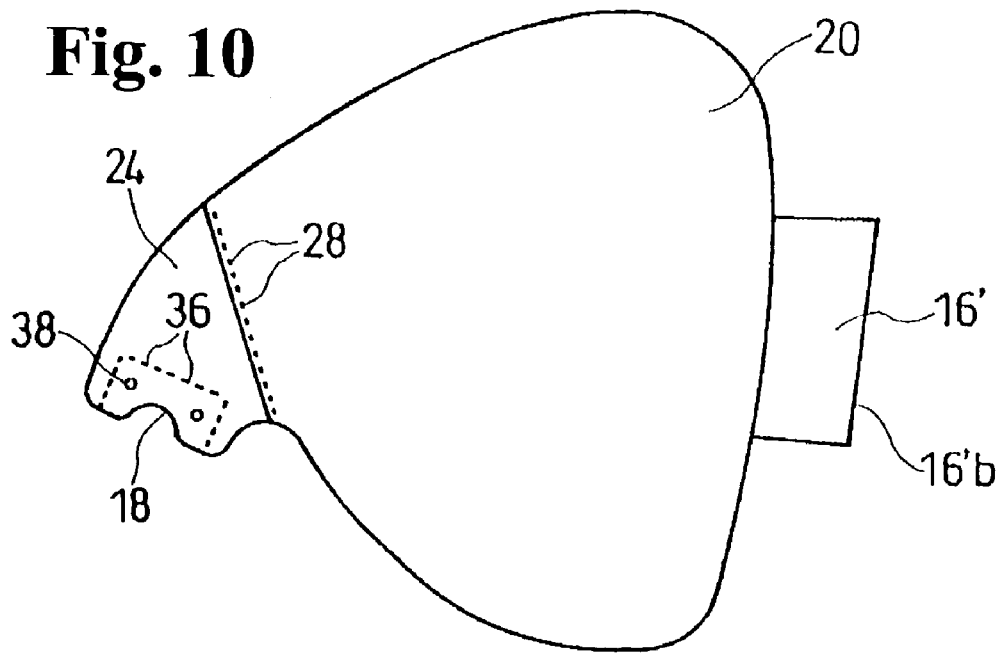
FIG. 10 is a view for explaining the manufacturing process of the airbag in FIG. 1.

As shown in FIG. 10, the joining line 30 is arranged inside each of the airbags 12 and 14. Therefore, the joined portions between the inner and outer panels 20 and 22 are not exposed outside, thereby obtaining smooth front ends of each of the airbags 12 and 14 facing the occupant.

The left and right half airbags 12 and 14 are arranged so that the respective inner panels 20 contact with each other when the airbags are expanded.

The tie panel 16 is formed of a pair of tie panel half bodies 16'. The tie panel half bodies 16' are connected to the front ends of the left and right half airbags 12 and 14, respectively. The tie panel half bodies 16' have base end hems 16'a sandwiched between the front hems 20a, 22a of the inner and the outer panels 20, 22 of the left half airbag 12 and the right half airbag 14, respectively. The tie panel half bodies are attached to the left half airbag 12 and the right half airbag 14 when the front hems 20a and 22a are joined together along the joining line 30.

The front end hems 16'b of the tie panel half bodies 16' attached to the left and right half airbags 12 and 14 are joined together, thereby connecting the front ends of the left half airbag 12 and the right half airbag 14. A reference numeral 32 in FIG. 3 represents a joining line between the front-end hems 16'b. The joining line 32 is arranged at an inner side of the tie panel 16, so that the joined portion between the front-end hems 16'b is not exposed, thereby obtaining a smooth front surface of the tie panel 16.

It is preferable that the tie panel 16 has a lateral width W of 200 to 450 mm (a. distance between the connecting portions of the tie panel half bodies 16' and the front ends of the airbags 12 and 14 when the tie panel 16 is fully extended as shown in FIG. 3). With the tie panel 16 having the width W within a range of 200 to 450 mm, when the airbags are inflated as shown in FIG. 4, the front ends of the left and right half airbags 12 and 14 face shoulders of the occupant having an average size, and the tie panel 16 is arranged in front of the occupant chest.

In the airbag 10 described above, it is possible to adjust the width W of the tie panel 16 by moving a position of the joining line 32 toward the front ends or base ends of the respective tie panel half bodies 16'.

An upper edge of the tie panel 16 is arranged below upper ends of the left and right half airbags 12 and 14 as shown in FIG. 5. Further, a lower edge of the tie panel 16 is arranged above lower ends of the left and right half airbags 12 and 14 as shown in FIG. 5.

The airbag 10 is mounted in an airbag apparatus for protecting the occupant in case of a vehicle collision. The airbag apparatus includes a retainer 1 for holding the airbag 10, inflators 2 for inflating the airbag 10, and a cover (not shown) mounted to the retainer 1. In the airbag 10, gas emitting ports 2a of the inflators 2 are provided in the left and right half airbags 12 and 14 through openings 18, respectively. A circumferential edge of the opening 18 is fixed to the retainer 1 with a bolt (not shown) along with the inflator 2.

In the embodiment described above, as shown in FIGS. 7 to 9, a reinforcing cloth 34 is attached to the circumferential edge of the opening 18 for reinforcement. A reference numeral 36 represents a joining line between the reinforcing cloth 34 and the circumferential edge of the opening 18. The reinforcing cloth 34 is attached to the circumferential edge of the opening 18 by sewing along the joining line 36. Further, holes 38 are formed around the opening 18 for allowing the bolts or the like to insert through the holes 38 and the reinforcing cloth 32.

The airbag 10 is folded and the cover is mounted to the retainer 1 to cover up the folded airbag 10, thereby forming the airbag apparatus. The cover is torn apart to open by a force pressed from the airbag 10 when the airbag 10 is inflated.

The airbag apparatus is installed at, for example, an instrument panel 6 in front of a passenger seat 4 of an automobile as shown in FIG. 12. The cover is substantially flush with the instrument panel 6 in a normal state. In case of a collision, the inflators 2 are operated to generate gasses. The gasses from the inflators 2 are introduced to the left and right half airbags 12 and 14, respectively. The airbag 10 pushes the cover to open and is inflated toward a front side of the occupant with a seat belt (not shown) on the passenger seat 4.

As described above, the left and right half airbags 12 and 14 are expanded such that the inner panels 20 thereof contact with each other. Further, the left and right half airbags 12 and 14 are expanded such that the front ends thereof face both shoulders of the occupant, and the tie panel 16 faces the occupant chest. A space S is formed behind the tie panel 16 as shown in FIG. 4.

When the occupant is plunged into the airbag 10, the front ends of the left and right half airbags 12 and 14 hold both shoulders of the occupant, and the tie panel 16 holds the chest. Due to the space S behind the tie panel 16, the tie panel 16 retreats elastically to receive the chest relatively softly when the occupant contacts the tie panel 16, thereby reducing the impact on the occupant chest when the occupant contacts with the tie panel 16.

In the airbag 10 described above, since the left and right half airbags 12 and 14 contact each other, the space S behind the tie panel 16 becomes smaller than the case that there is no contact between the airbags. Therefore, it is possible to prevent the occupant from excessively plunging into the tie panel 16 and the space S. In addition, since the left and right half airbags 12 and 14 contact each other, the airbags support with each other to prevent the folding (buckling) of the left and right half airbags 12 and 14, so that the airbag 10 securely receive both shoulders of the occupant.

Next, a manufacturing process of the left and right half airbags 12 and 14 will be explained. FIGS. 6 to 10 are views for explaining the manufacturing process of the right half airbag 14. The same process is used for manufacturing the left half airbag 12 except that the arrangement of the inner and outer panels 20 and 22 are opposite to each other.

As shown in FIG. 6, the inner panel 20, the outer panel 22 and the rear end panel 24 are placed. The rear hems 20b and 22b of the inner and outer panels 20 and 22 are overlapped with both end hems 24c and 24d of the rear end panel 24. Accordingly, both ends of the inner circumferential hem 24a of the rear end panel 24 and the lower hems 20d and 22d of the inner and outer panels 20 and 22 are aligned, and the outer circumferential hem 24b of the rear end panel 24 and the rear hems 20b and 22b of the inner and outer panels 20 and 22 are aligned. Then, the inner and outer panels 20 and 22 are joined with the rear end panel 24 along the joining lines 28. A reinforcing cloth 34 is attached to the inner surface of the rear end panel 24 (an inner surface of an airbag product) along the joining line 36 to reinforce the circumferential end of the hole 18.

Figure 7:
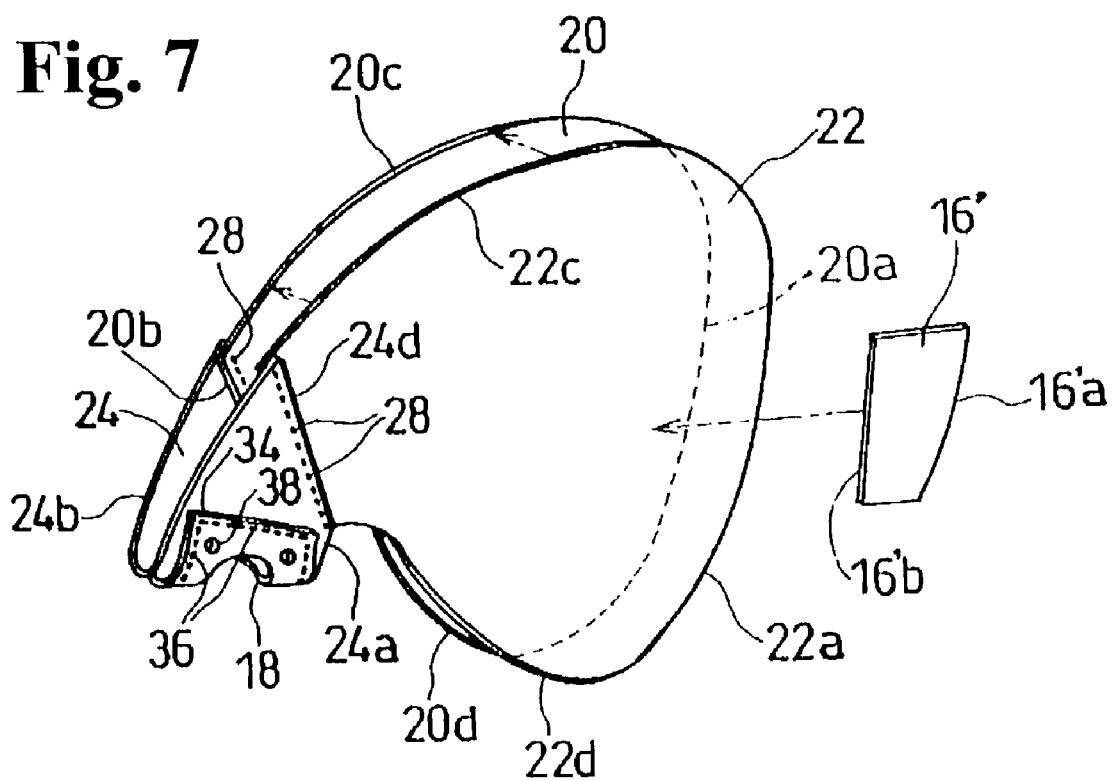
FIG. 7 is a view for explaining the manufacturing process of the airbag in FIG. 1.

Then, as shown in FIG. 7, the rear end panel 24 is folded along a folding line L so that the outer surfaces of the inner and outer panels 20, 22 (the outer surfaces of the airbag product) face with each other.

At this time, the tie panel half body 16' is inserted into the front hems 20a and 22a of the inner and outer panels 20 and 22 such that the front end edge 16'b thereof faces the center of the inner and outer panels 20 and 22. The base end edge 16'a of the tie panel half body 16' is arranged to orient along the front hems 20a and 22a.

Then, as shown in FIG. 8, one half of the inner circumferential hem 24a and the other half thereof, one half of the outer circumferential hem 24b and the other half thereof, and the upper hems 20c and 22c, front hems 20a and 22a, and lower hems 20d and 22d of the inner and outer panels 20 and 22, are joined along the joining line 30. The base end hem 16'a of the tie panel half body 16' between the front hems 20a and 22a is also joined to the front hems 20a and 22a by the joining process. As a result, the right half airbag 14 (or the left half airbag 12, the same will be applied hereinafter) is formed in a state that the inner sides are exposed outwardly.

Figure 9:
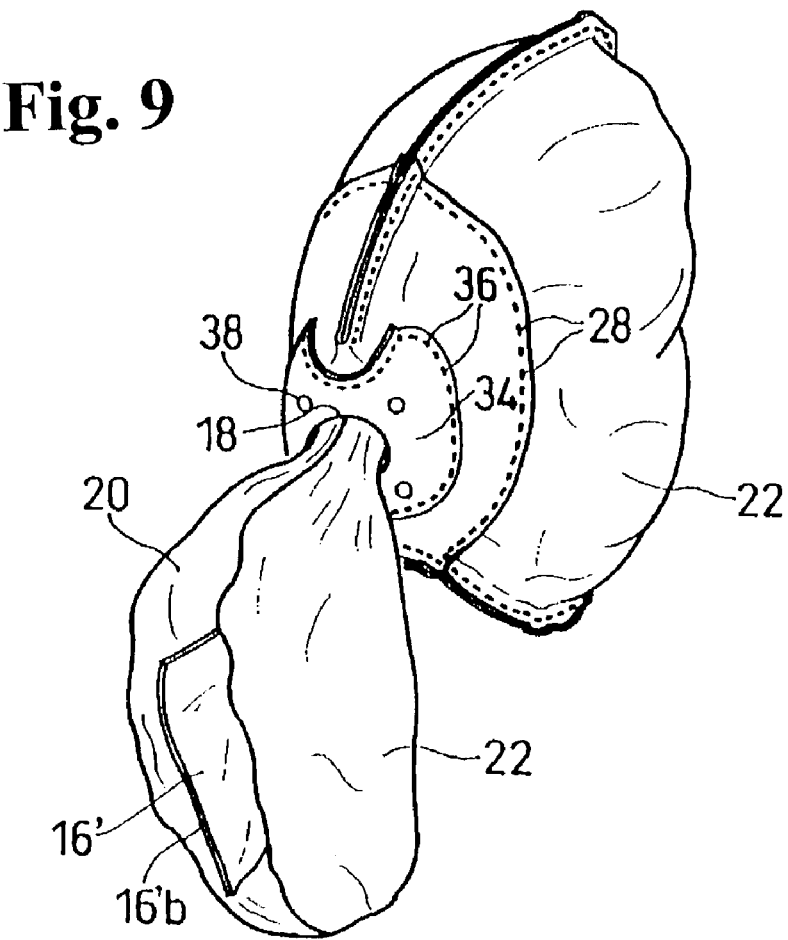
FIG. 9 is a view for explaining the manufacturing process of the airbag in FIG. 1.

Next, the right half airbag 14 is turned inside out through the inflator opening 18 (FIG. 9). As shown in FIG. 10, the joining line 30 is arranged within the airbag, thereby completing the manufacturing processes of the right half airbag 14 in which the front end of the tie panel half body 16' extends from the front end of the airbag.

Figure 11:
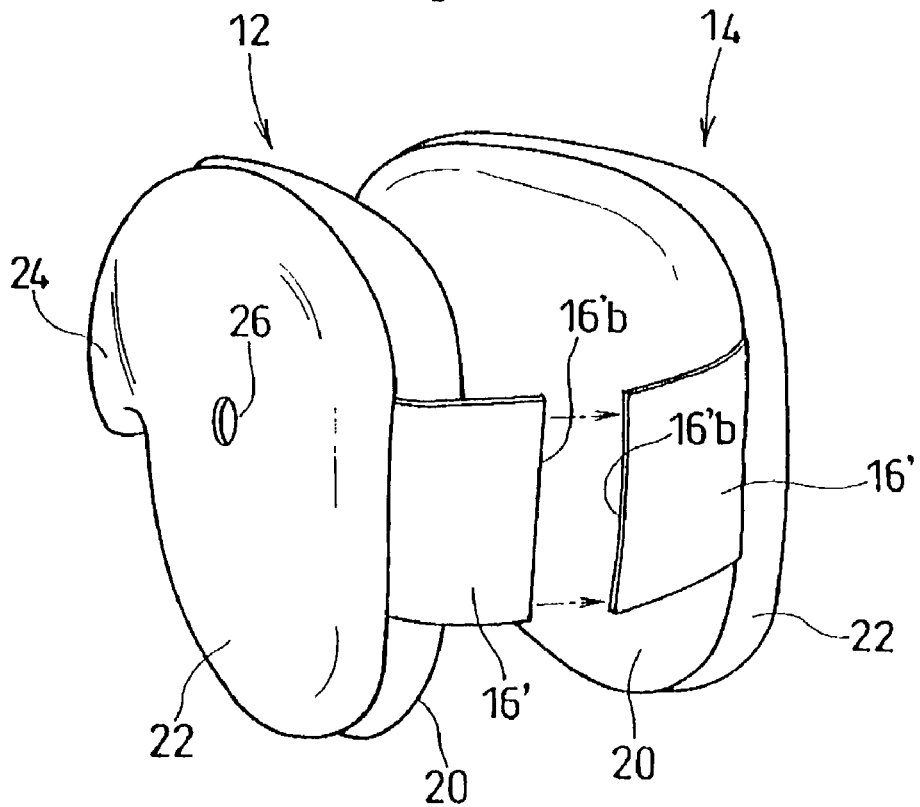
FIG. 11 is a view for explaining the manufacturing process of the airbag in FIG. 1.
Figure 12:
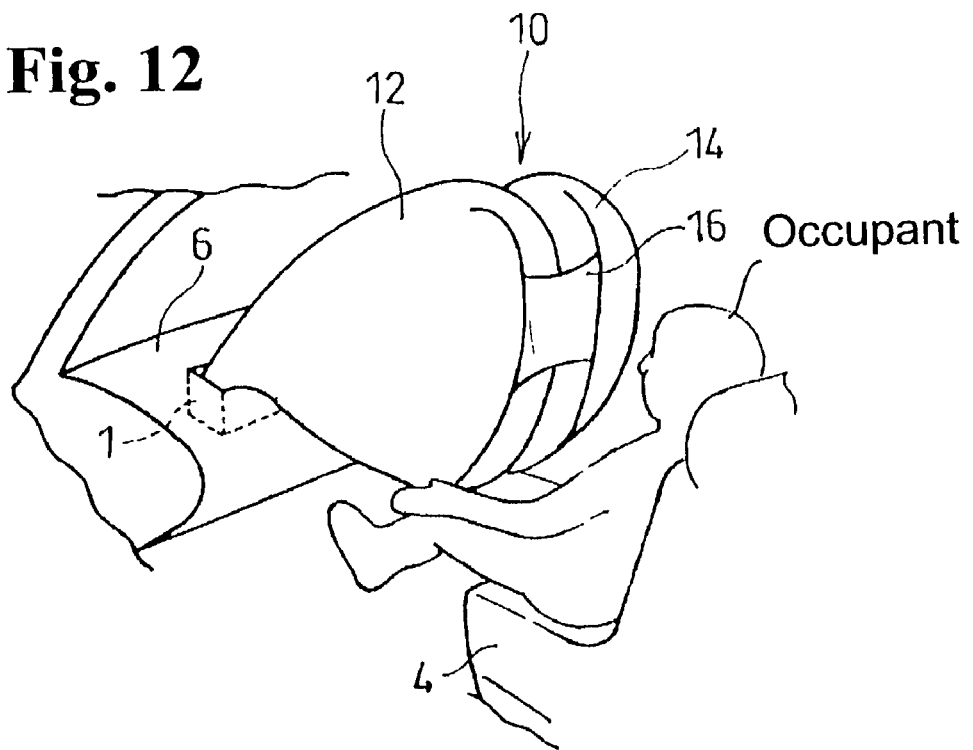
FIG. 12 is a perspective view showing an airbag apparatus having the airbag in FIG. 1.

The left half airbag 12 manufactured in the same process as the right half airbag 14 is arranged together with the right half airbag 14, as shown in FIG. 11. The front end hems 16'b of the tie panel half bodies 16' extending from the front ends of the respective airbags 12 and 14 are joined along the joining line 32, thereby completing the manufacturing of the airbag 10. The joining line 32 is arranged inside the tie panel 16.

In this embodiment, a circular vent hole 26 is provided around the center of each outer panel 22 of the left and right half airbags 12 and 14. However, the shape, arrangement and number of the vent holes 26 are not limited to the structure described above.

In this embodiment, the reinforcing cloth 34 formed in a substantially square is provided to reinforce the circumferential edge of each inflator opening of the left and right half airbags 12 and 14. However, the shape of the reinforcing cloth 34 is not limited to the structure described above. Further, instead of the reinforcing cloth, the circumferential portion of the hole 18 may be reinforced with other structural modifications like a stitch.

Figure 13:
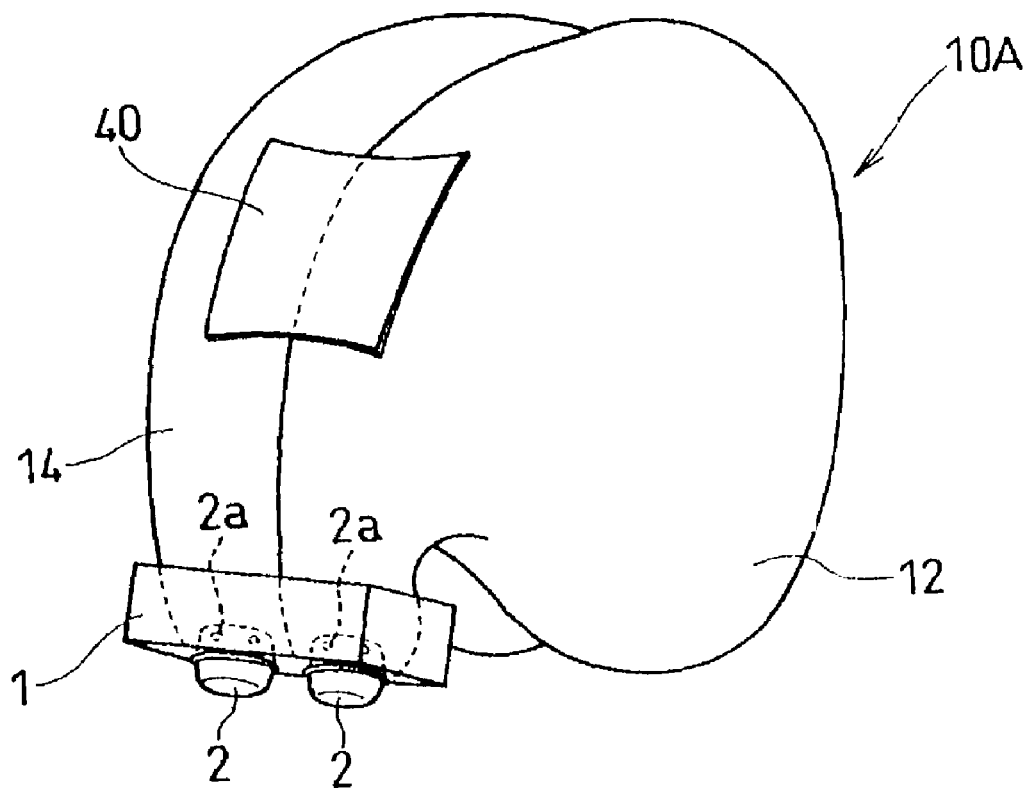
FIG. 13 is a perspective view of an airbag according to another embodiment of the present invention.

FIG. 13 is a perspective view of a rear end side of an airbag according to another embodiment of the present invention.

In an airbag 10A in FIG. 13, the upper portions of the left and right half airbags 12 and 14 are connected with a connecting panel 40. The connecting panel 40 has a lateral length corresponding to a distance between the upper portions of the left and right half airbags 12 and 14 when the left and right half airbags 12 and 14 are expanded.

The other construction of the airbag 10A is the same as that of the airbag 10 shown in FIGS. 1 to 12. In FIG. 13, the same reference numerals indicate the same parts in FIGS. 1 to 12.

In the airbag 10A, when the left and right half airbags 12 and 14 are expanded and the occupant is plunged into the front ends thereof, a heavy load is applied to suppress the left and right half airbags 12 and 14 in the front and rear directions. Nevertheless, since the connecting panel 40 joins the upper portions of the left and right half airbags 12 and 14, it is possible to prevent the buckling deformation such as the central portions of the left and right half airbags 12, 14 are separated from each other.

In addition, in the airbag 10A, the upper portions of the left and right half airbags are connected to thereby prevent the buckling deformation such as the central portions of the left and right half airbags 12, 14 are separated. Except those components described above, the lower portions (not shown) of the left and right half airbags may be connected by a connecting panel, or the left and right half airbags may be connected by a series of connecting panels that extend from the upper portions through the front ends to the lower portions.

In the airbag apparatus of the embodiments as described above, two cylindrically shaped inflators 2 with a short axial length called a disc type are used. The inflators 2 are inserted into each inflator opening 18 of the left and right half airbags 12 and 14 to introduce the gas into the left and right half airbags 12 and 14, respectively. However, the device for introducing the gas into the left and right half airbags is not limited to the inflators 2 described above.

Figure 14:
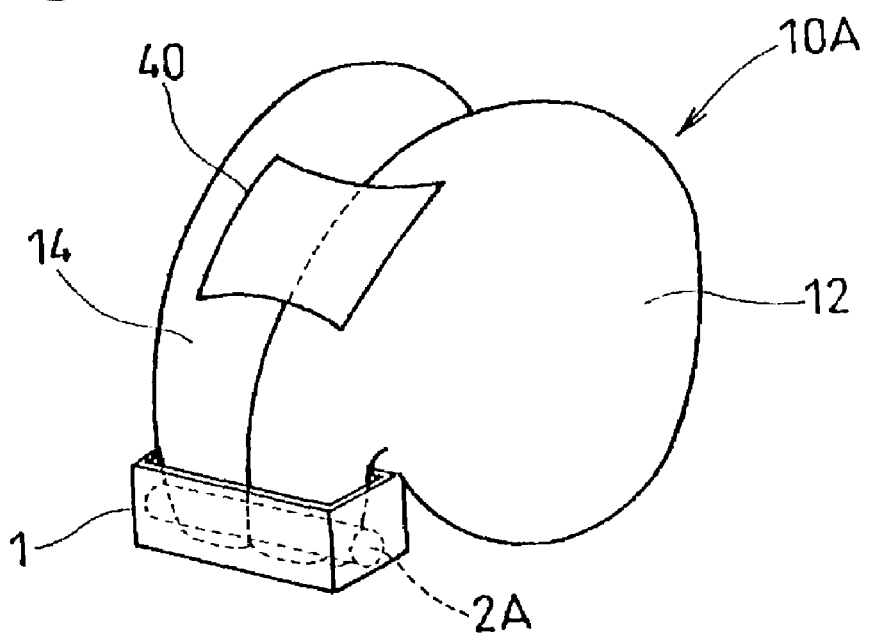
FIG. 14 is a perspective view showing an airbag apparatus having the airbag in FIG. 13.

For example, as shown in FIG. 14, the gas can be introduced into the left and right half airbags 12 and 14 from one inflator 2A formed in a horizontally long rod. Further, except those described above, ducts may be provided in one inflator to thereby divide the gas from the one inflator into two. In other words, the ducts can be used to distribute the gas from the one inflator to the left and right half airbags.

The other components of the airbag apparatus in FIG. 14 are the same as those of the airbag apparatus in FIG. 13 except that the rod-shaped inflator 2A is used instead of the disc type inflators 2 in FIG. 13. The reference numerals in FIG. 14 are identical to those in FIG. 13, and indicate the same parts as those in FIG. 13.

Figure 15:
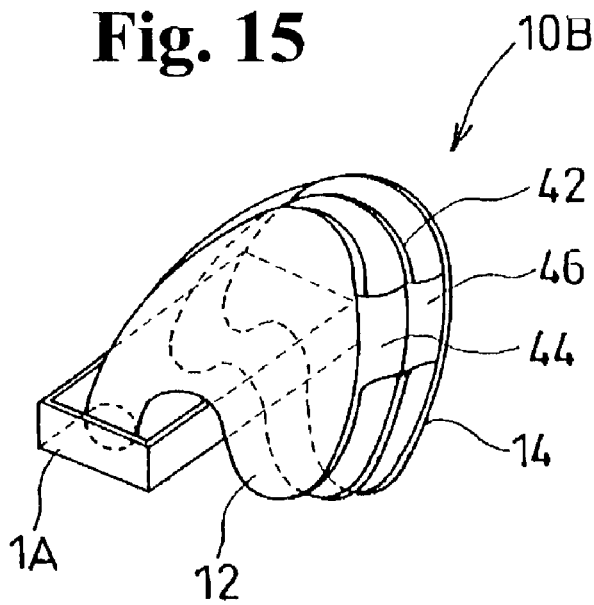
FIG. 15 is a perspective view of an airbag according to another embodiment of the present invention.

FIG. 15 is a perspective view of an airbag according to another embodiment of the present invention.

In addition to the airbag apparatus described above, an airbag 10B in FIG. 15 has an intermediate airbag 42, which is constructed similarly to the left and right half airbags 12 and 14, between the left and right half airbags 12 and 14. A tie panel 44 joins the front ends of the left half airbag 12 and the intermediate airbag 42, and a tie panel 46 joins the front ends of the right half airbag 14 and the intermediate airbag 42. A reference numeral 1A in FIG. 15 indicates a retainer for holding the airbag 10B.

The aforementioned airbag 10B can be used as, for example, an occupant protecting airbag for a rear seat of an automobile and a bench seat where occupants are seated side by side. In other words, the airbag 10B can hold two occupants with the tie panels 44 and 46 when the two occupants sit next to each other with their shoulders being side by side.

In the aforementioned embodiment, one intermediate airbag 42 is sandwiched between the left and right half airbags 12 and 14. Alternatively, two or more intermediate airbags similar to the left and right half airbags 12 and 14 may be sandwiched between the left and right half airbags 12 and 14. In this case, tie panels are used to join the left half airbag and the intermediate airbags adjacent thereto, the neighboring intermediate airbags with each other, and the right half airbag and the intermediate airbag adjacent thereto.

In the embodiments described above, the left and right half airbags 12 and 14 (and the intermediate airbag 42) are formed in a trapezoidal shape (viewed from the lateral side), respectively; as shown in FIG. 5. However, the shape of the left and right half airbags (and the intermediate airbag) in the present invention is not limited to the specific one.

Figure 16A:
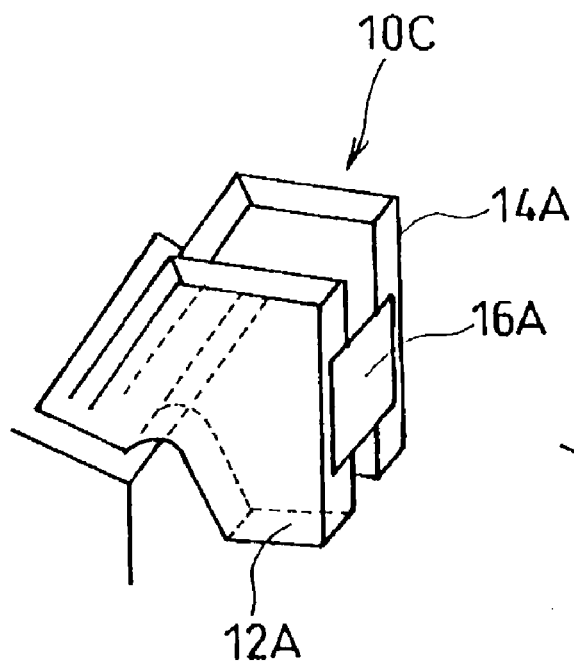
FIGS. 16(a) and 16(b) are perspective views showing an airbag formed in a different shape.
Figure 16B:
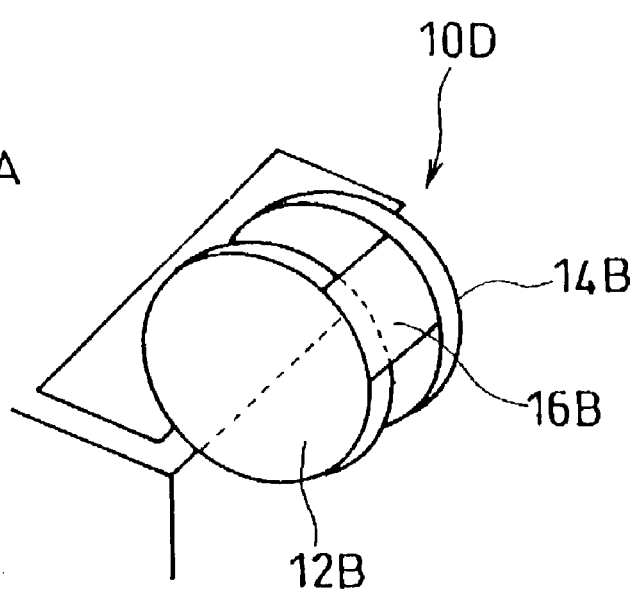

For example, an airbag 10C in FIG. 16(a) is constructed such that left and right half airbags 12A and 14A are formed in polygonal shapes (viewed from the lateral side). A tie panel 16A joins the respective front-end surfaces of the airbags. Further, an airbag 10D in FIG. 16(b) is constructed such that left and right half airbags 12B and 14B are formed in circular shapes (viewed from the lateral side). A tie panel 16B joins the respective front-end surfaces of the airbags. In the airbag of the present invention, the left and right half airbags (and the intermediate airbag) can be made into various shapes other than those described above.

Figure 17:
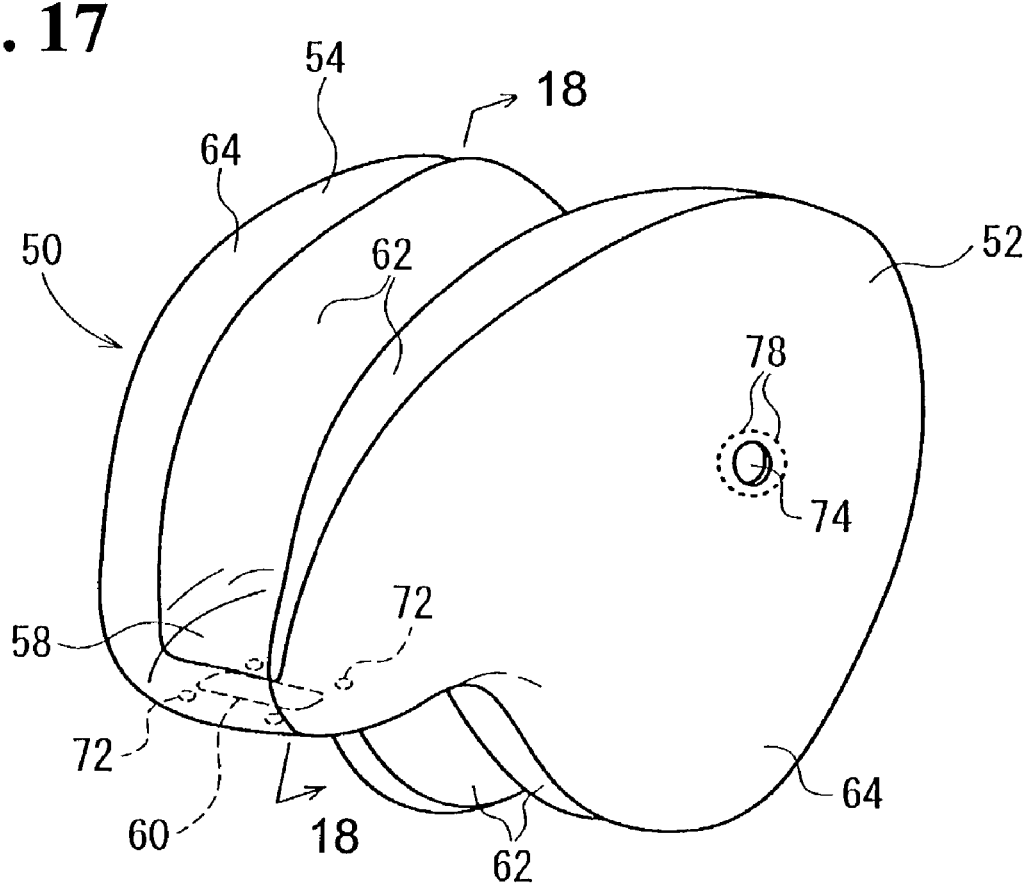
FIG. 17 is a perspective view of an airbag according to another embodiment of the present invention.
Figure 18:
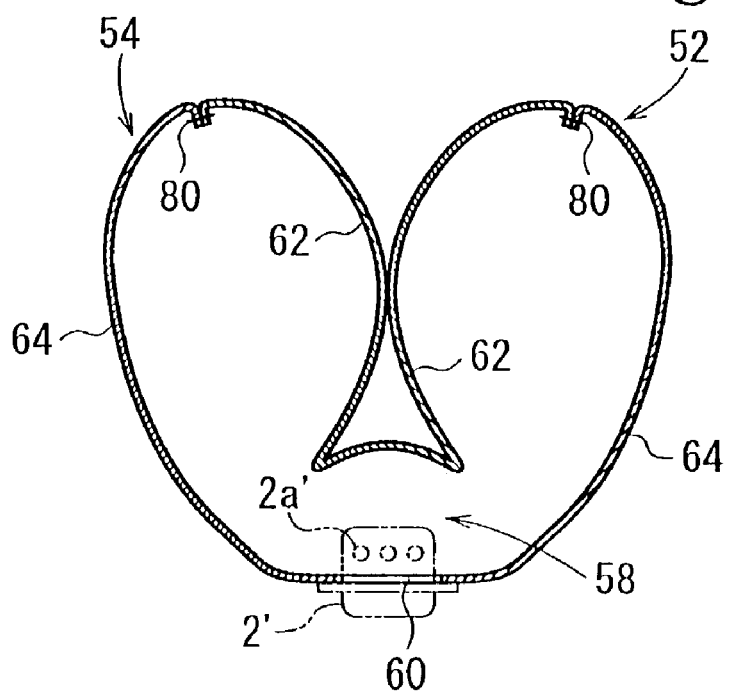
FIG. 18 is a sectional view taken along line 18-18 in FIG. 17.

FIG. 17 is a perspective view of an airbag according to another embodiment of the present invention. FIG. 18 is a sectional view taken along line 18-18 in FIG. 17. FIGS. 19 to 24 are views for explaining a manufacturing process of the airbag.

An airbag 50 in FIG. 17 comprises a left half airbag 52 to be inflated toward the front left side of the occupant; a right half airbag 54 to be inflated toward the front right side of the occupant; a pair of tie panel half bodies 56 for connecting front ends of the left and right half airbags 52 and 54; a communicating part 58 for communicating rear ends of the left and right half airbags 52 and 54 with each other; and an inflator opening 60 formed at the communicating part 58.

The airbag 50 comprises an inner panel 62 having panel portions 66, 68 and 70 constituting respective inner surfaces of the left and right half airbags 52 and 54, which face each other when assembled into an airbag product, and the communicating part 58; and an outer panel 64 having panel portions 66', 68' and 70' constituting respective outer surfaces of the left and right half airbags 52 and 54 and the communicating part 58.

The inflator opening 60 is provided in the panel portion 70' constituting the communicating part 58 of the outer panel 64. Holes 72 are provided around the hole 60 for inserting bolts, etc., to fix the airbag 50 to a retainer (not shown) of an airbag apparatus.

Further, vent holes 74 are provided at the panel portions 66' and 68' of the outer panel 64 constituting the left and right half airbags 52 and 54. Reinforcing cloths 76 are provided at circumferential edges of the respective vent holes 74. A reference numeral 78 indicates a joining line of the reinforcing cloth 76 to the outer panel 64. The reinforcing cloth 76 is attached to the outer panel 64 along the joining line 78 by sewing or the like.

Figure 19:
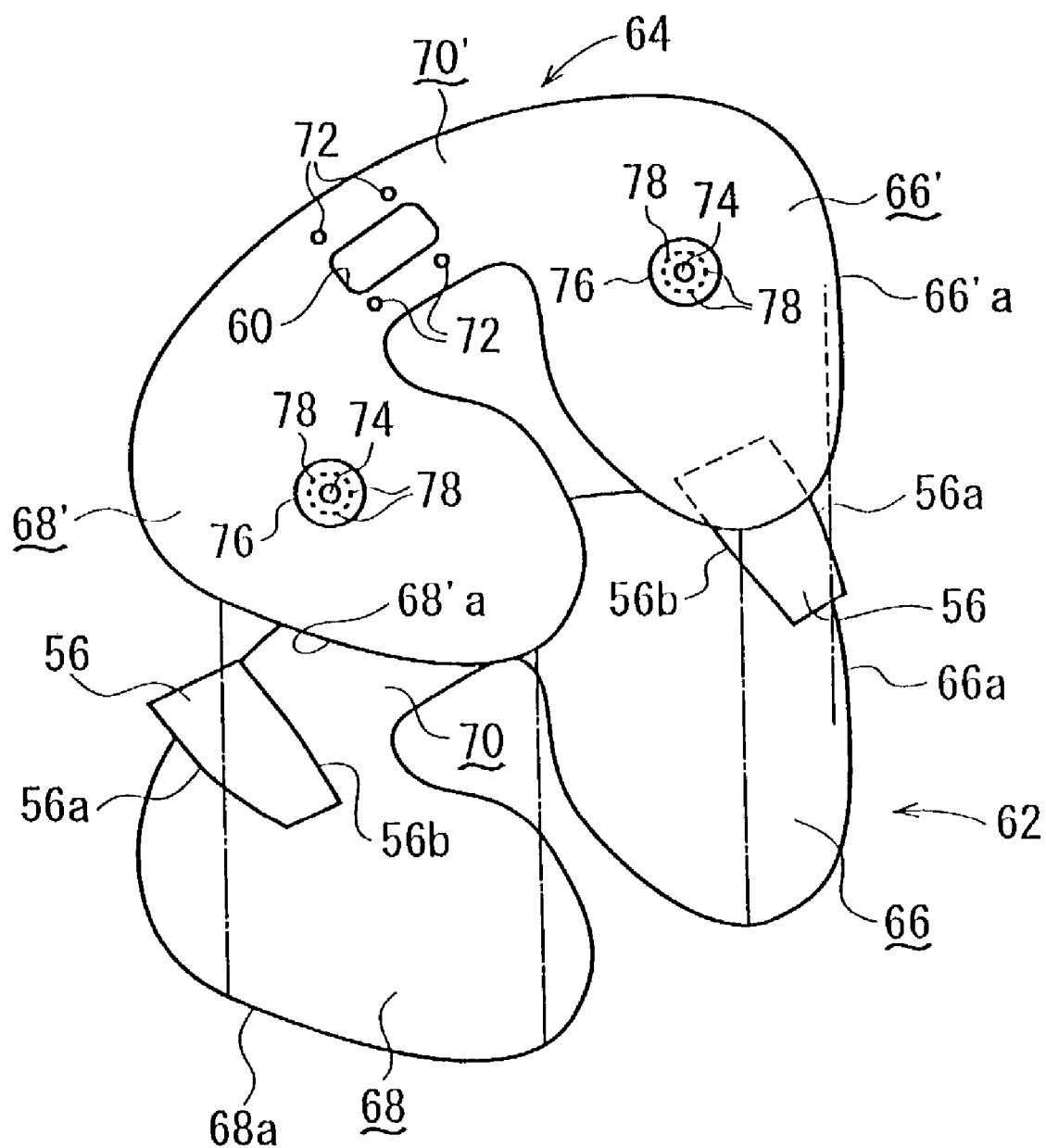
FIG. 19 is a view for explaining a manufacturing process of the airbag in FIG. 17.

Panel portions 66 and 66', panel portions 68 and 68', and panel portions 70 and 70' are respectively formed in a plane-symmetrical mirror image. The panel portions 66 and 66' and panel portions 68 and 68', as shown in FIG. 19, are disposed at sides of the front hems 66a and 66'a and front hems 68a and 68'a, which face the occupant and become apart when constructed into an airbag product. The front hems 66a and 66'a and the rear ends thereof facing the front hems 68a and 68'a are connected to both ends of the panel portions 70, 70', respectively.

As shown in FIG. 19, the inner panel 62 and outer panel 64 are overlapped in a symmetrical shape, and both circumferential edges thereof are joined along a joining line 80, which extends around the circumferential edge of the inner and outer panels 62 and 64, by sewing or the like, thereby constituting the left and right half airbags 52 and 54 shaped in a bag and a communicating part 58 communicating between the rear portions of the left and right half airbags 52 and 54. Further, as shown in FIG. 18, the joining line 80 is arranged inside the airbag 50. Therefore, the joined portion between the inner and outer panels 62 and 64 is not exposed outside the airbag 50, thereby obtaining a smooth surface of the airbag 50.

The left and right half airbags 52 and 54 are arranged such that the respective inner panels 62 thereof contact with each other when the airbags are expanded.

The tie panel half bodies 56 are connected to front ends of the left and right half airbags 52 and 54, respectively. The tie panel half bodies 56 have base end hems 56a sandwiched between the front hems 66a and 66'a of the panel portions 66 and 66' and between front hems 68a and 68'a of the panel portions 68 and 68', respectively. The front hems 66a and 66'a and front hems 68 and 68'a are joined along the joining line 80 to connect to the tie panel half bodies, respectively. The front end hems 56b of the tie panel half bodies 56 connected to the left and right half airbags 52 and 54 are joined, thereby connecting the front ends of the left and right half airbags 52 and 54.

In the embodiment, the tie panel half bodies 56 are connected such that a length between connecting portions of the respective tie panel half bodies 56 and the front ends of the respective airbags 52 and 54 becomes 200 to 450 mm when the tie panel half bodies 56 are extended between the front ends of the left and right half airbags 52 and 54.

Further, in the above embodiment, upper edges of the respective tie panel half bodies 56 are arranged below the upper ends of the left and right half airbags 52 and 54, and lower edges of the, respective tie panel half bodies 56 are arranged above the lower end of the left and right half airbags 52 and 54.

Further, as shown in FIG. 18, a gas emitting port 2'a of an inflator 2' is arranged inside the communicating part 58 through the opening 60. When the inflator 2' operates, the gas from the gas emitting port 2'a is introduced into the left and right half airbags 52 and 54 from both ends of the communicating part 58. The gas inflates the left and right half airbags 52 and 54 toward the front left and front right sides of the occupant. When the left and right half airbags 52 and 54 are expanded, a space is formed behind the tie panel half bodies 56.

When the occupant is plunged into the airbag 50, the front ends of the left and right half airbags 52 and 54 hold both shoulders of the occupant and the tie panel half bodies 56 hold chest of the occupant. Due to a space S behind the tie panel half bodies 56, the tie panel half bodies 56 retreat elastically to receive the chest relatively softly, when the chest contacts the tie panel half bodies 56, thereby reducing the impact on the chest when the occupant contacts the tie panel half bodies 56.

As described above, the left and right half airbags 52 and 54 are inflated to cause the inner panels 62 thereof contact with each other. Therefore, when the occupant is plunged into the airbag 50, the left and right half airbags 52 and 54 support with each other to prevent the folding (buckling) of the left and right half airbags 52 and 54, thereby securely receiving both shoulders of the occupant.

Since the left and right half airbags 52 and 54 contact with each other, the space S behind the tie panel half bodies 56 becomes smaller, thereby preventing the occupant from being excessively plunged into the tie panel half bodies 56 and the space S.

In the airbag 50 as described above, the left and right half airbags 52 and 54 are communicated with each other through the communicating parts 58, so that one inflator 2' can inflate the whole airbag 50. In other words, the airbag apparatus is equipped with only one inflator, thereby reducing a cost of manufacturing the airbag apparatus.

Next, a manufacturing process of the airbag 50 will be described below.

As shown in FIG. 19, the inner and outer panels 62 and 64 are overlapped with outer surfaces (outer surfaces of an airbag product) thereof facing each other in a symmetrical shape. Base end hems 56a of the tie panel half bodies 56 are sandwiched between the front hems 66a and 66'a of the panel portions 66 and 66', and between those 68a and 68a' of the panel portions 68, 68', respectively.

At this time, the respective tie panel half bodies 56 are arranged so that the front-end hems 56b thereof face center sides of the respective panel portions 66 and 66', and the panel portions 68 and 68'.

Figure 20:
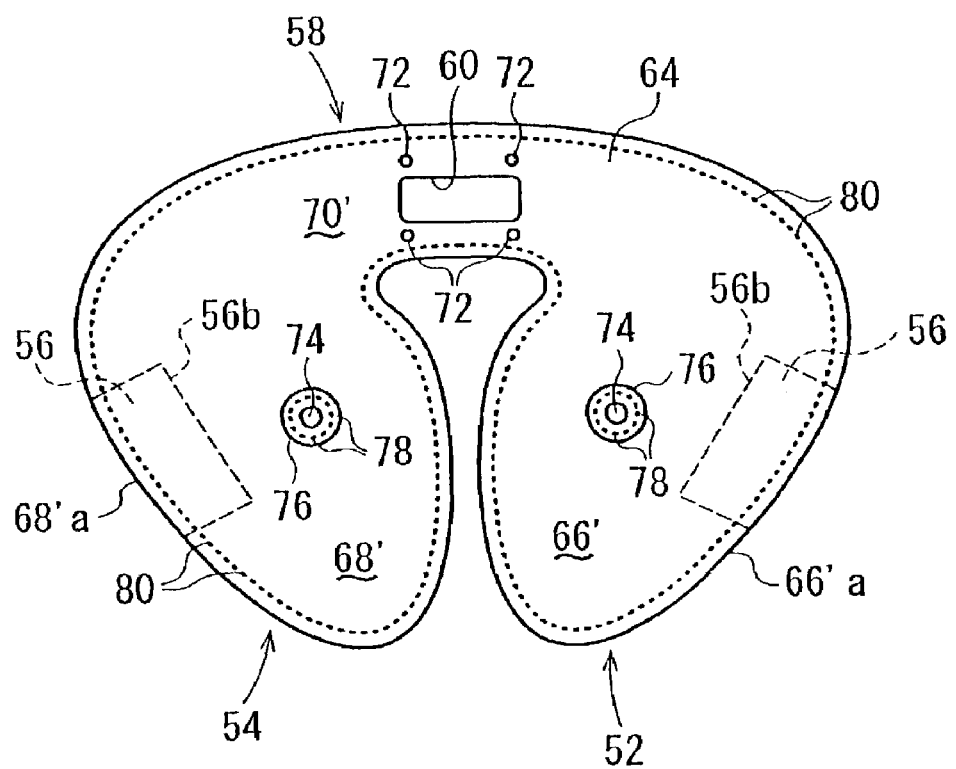
FIG. 20 is a view for explaining the manufacturing process of the airbag in FIG. 17.

Next, as shown in FIG. 20, circumferential edges of the inner and outer panels 62 and 64 are joined along the joining line 80. The base end hems 56a of the respective tie panel half bodies 56 sandwiched between the front hems 66a and 66'a and between the front hems 68a and 68'a are also combined with the front hems 66a and 66'a and the front hems 68a and 68'a by the joining operation described above. As a result, the left and right half airbags 52 and 54 and the communicating part 58 are manufactured in a state that the inner sides face outwardly.

Figure 21:
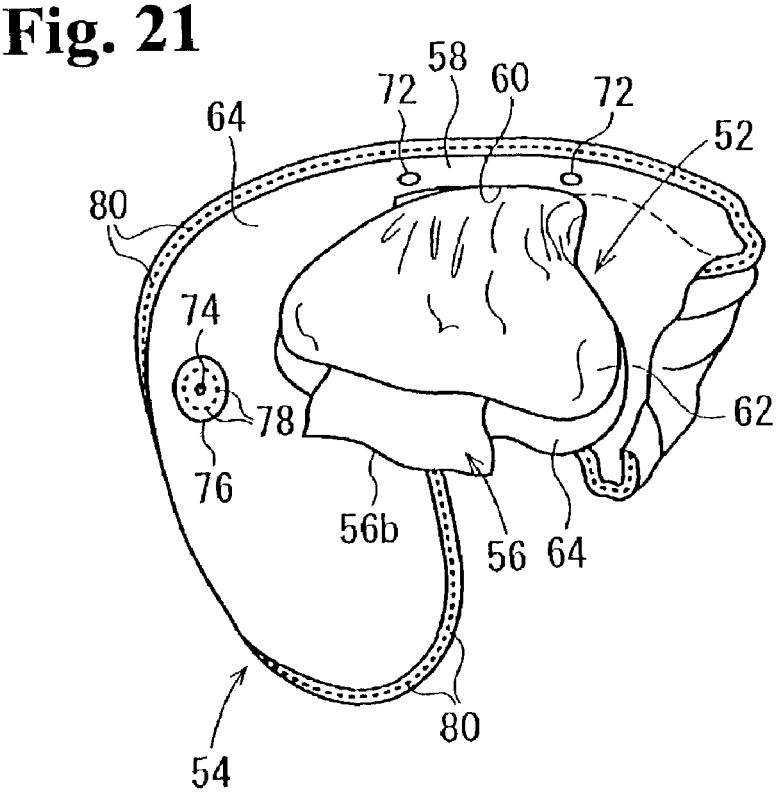
FIG. 21 is a view for explaining the manufacturing process of the airbag in FIG. 17.
Figure 22:
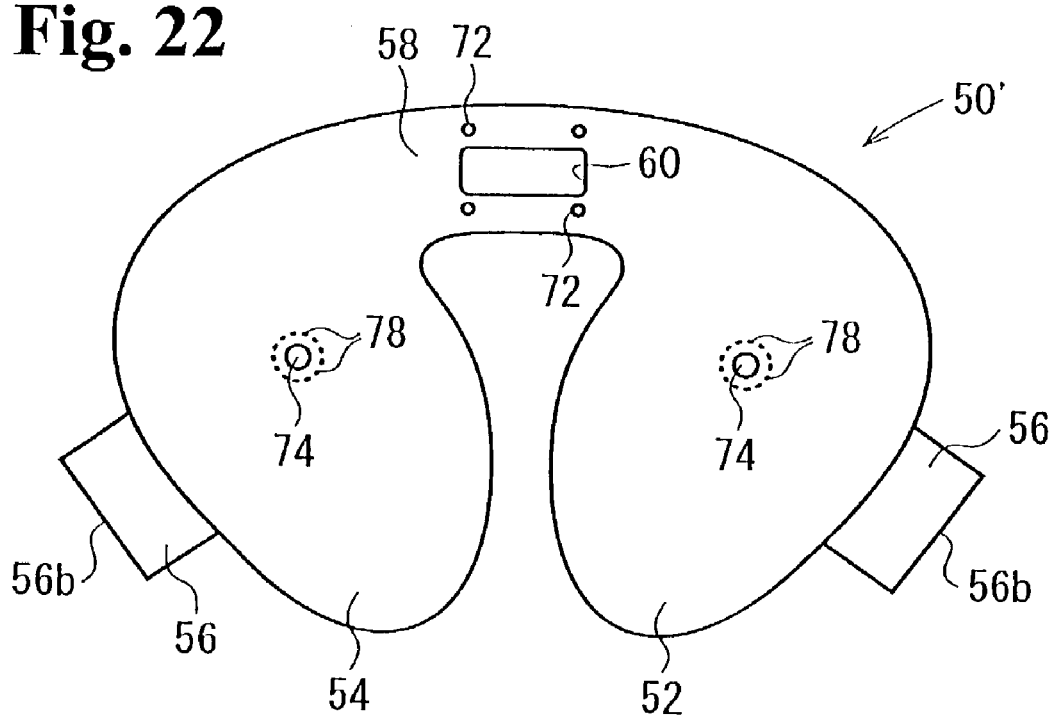
FIG. 22 is a view for explaining the manufacturing process of the airbag in FIG. 17.
Figure 23:
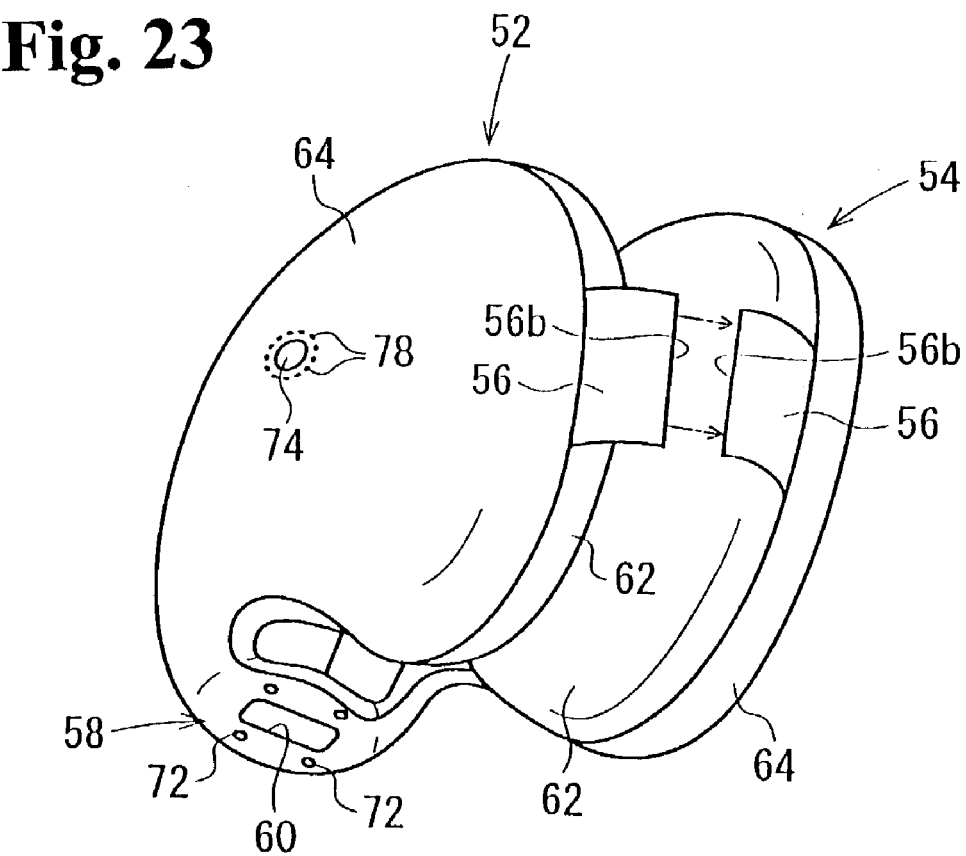
FIG. 23 is a view for explaining the manufacturing process of the airbag in FIG. 17.

Then, as shown in FIG. 21, the inner and outer panels 62 and 64 are reversed through the inflator opening 60. As a result, as shown in FIG. 22, the joining line 80 is arranged inside the airbag to obtain an airbag product intermediate body 50' in which the front ends of the tie panel half bodies 56 extend from the front ends of the left and right half airbags 52 and 54, respectively.

The airbag product intermediate body 50' is respectively folded around a borderline between the left and right half airbags 52, 54 and the communicating part 58 so that the inner panels 62 of the left and right half airbags 52 and 54 face with each other. The front end hems 56b of the tie panel half bodies 56 extending from the front ends of the airbags 52 and 54 are joined together, thereby completing the airbag 50.

In the aforementioned embodiment, the inner and outer panels 62 and 64, in which the panel portions 66, 68, 70 and the panel portions 66', 68', 70' are integrated, are used. Alternatively, it is possible to separately form the respective panel portions and combine them prior to the manufacturing of the airbag to construct the inner and outer panels shaped like those in FIG. 19. In the case of separate formation of the respective panel portions, a material type, thickness or the like may be properly changed according to the required strength of the respective panel portions.

Figure 24:
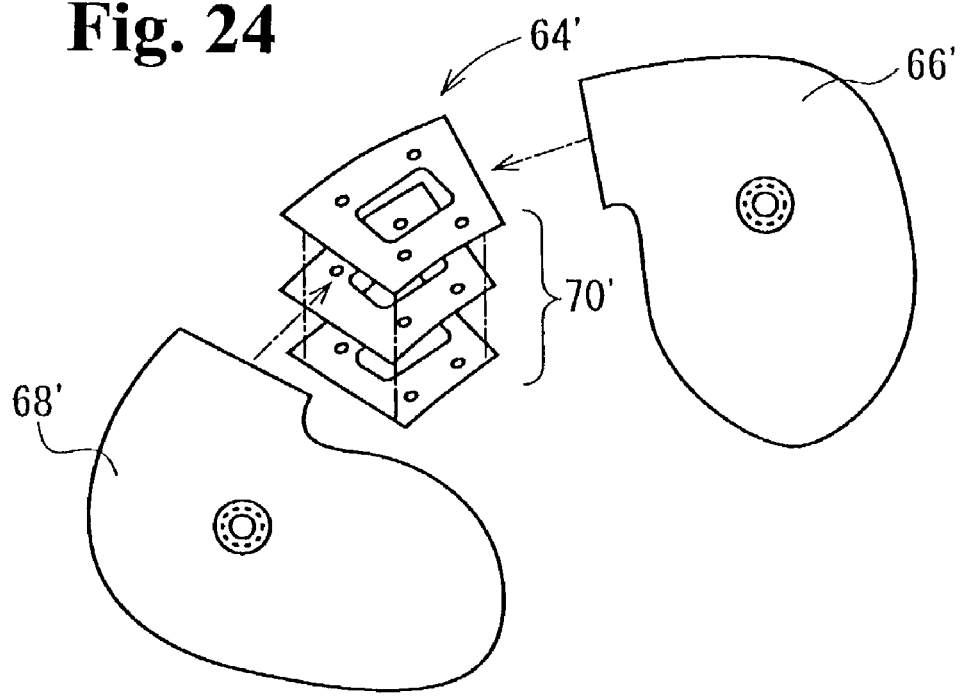
FIG. 24 is a view for explaining the manufacturing process of the airbag in FIG. 17.

For example, the outer panel 64' in FIG. 24 is formed of separately formed panel portions 66', 68' and 70'. The panel portion 70' constituting a portion connecting with the retainer of the airbag apparatus is formed of triple-folded panel sheets to increase the strength.

As the panel portions are separately formed, it is possible to manufacture the inner and outer panels with large areas and complex shapes from a relatively small panel material without any waste, and possible to reinforce only necessary portions, thereby making it possible to construct the airbag efficiently and economically.

Figure 25:
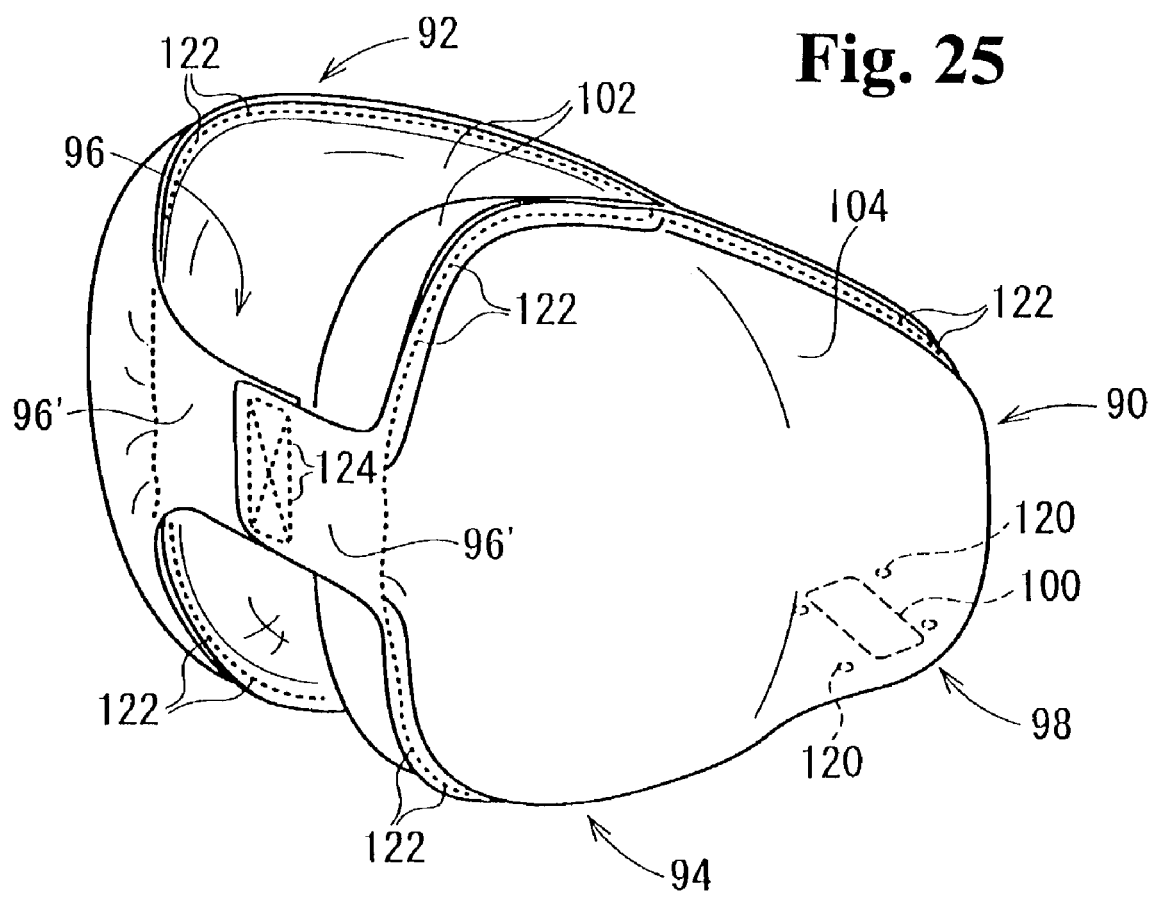
FIG. 25 is a perspective view of an airbag according to another embodiment of the present invention.
Figure 26A:
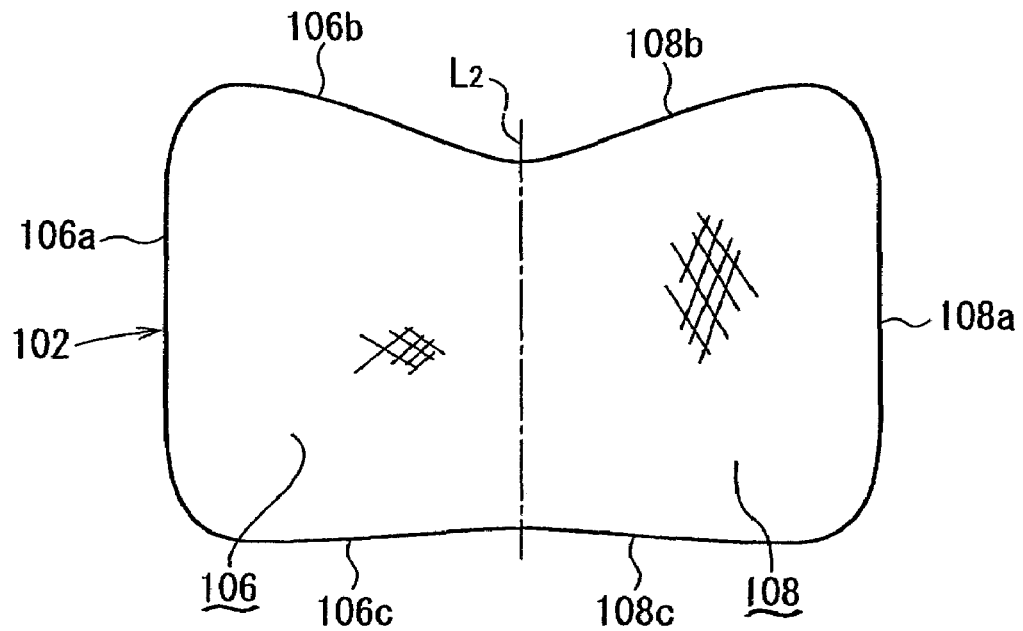
FIGS. 26(a) and 26(b) are plan views of inner and outer panels of the airbag in FIG. 25.
Figure 26B:
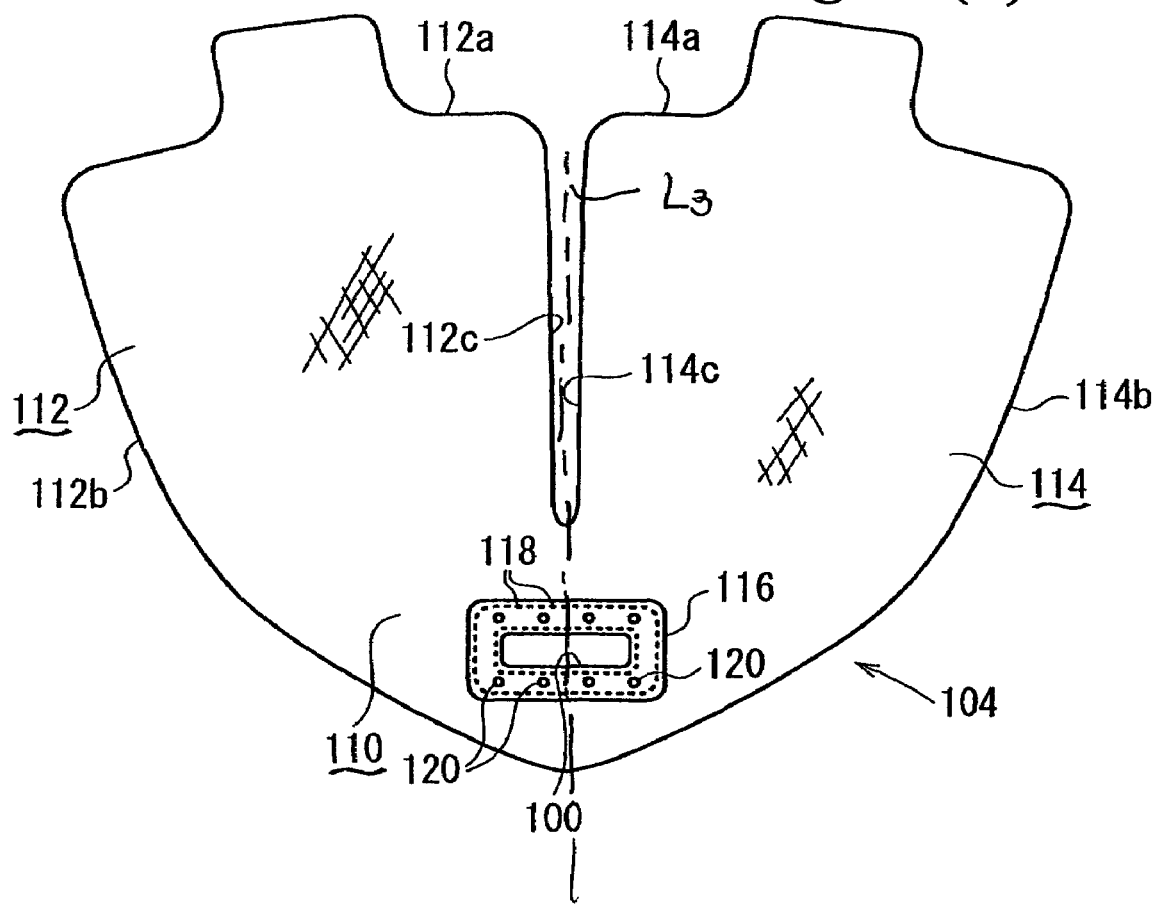
Figure 27:
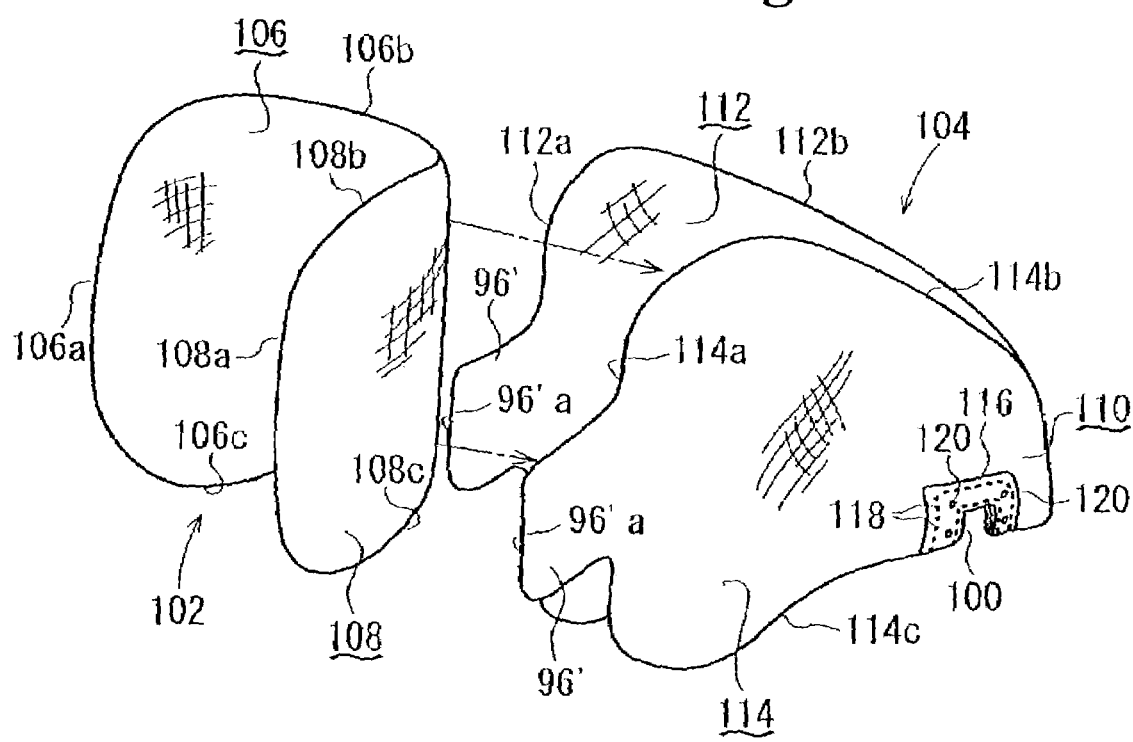
FIG. 27 is an exploded perspective view of the airbag in FIG. 25.
Figure 28:
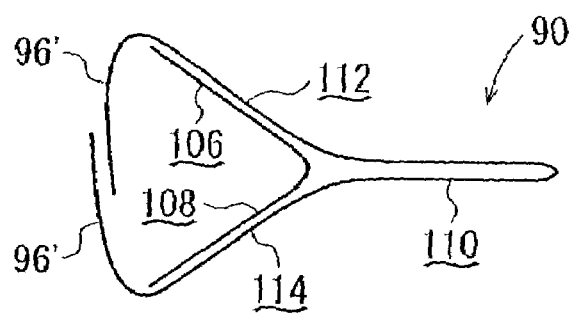
FIG. 28 is a top plan view schematically illustrating an arrangement of inner and outer panels of the airbag in FIG. 25.

In this embodiment, the airbag 50 in which the left and right half airbags 52 and 54 communicate with each other is constructed according to the manufacturing process. The airbag in which the left and right half airbags communicate with each other may be constructed according to other manufacturing method. For example, in an airbag 90 in FIGS. 25 to 27, the left and right half airbags are constructed to communicate with each other according to a process different from that for the airbag 50. FIG. 25 is a perspective view of the airbag 90, and FIGS. 26(a) and 26(b) are plan views of inner and outer panels of the airbag 90. FIG. 27 is an exploded perspective view of the airbag 90, and FIG. 28 is a top plan view schematically illustrating an arrangement of the inner and outer panels of the airbag 90.

The airbag 90 comprises a left half airbag 92 to be inflated toward the front left side of the occupant; a right half airbag 94 to be inflated toward the front right side of the occupant; a tie panel 96 connecting front ends of the left and right half airbags 92 and 94; a communicating part 98 for communi-cating rear ends of the left and right half airbags 92 and 94; and an inflator opening 100 formed at the communicating part 98.

The airbag 90 has an inner panel 102 constituting inner surfaces of the left and right half airbags 92 and 94 facing with each other when the airbag is constructed, and an outer panel 104 constituting outer surfaces of the left and right half airbags 92, 94 and the communicating part 98.

As show in FIG. 26(a), the inner panel 102 includes a left half panel portion 106 constituting an inner surface of the left half airbag 92 and a right half panel portion 108 constituting an inner surface of the right half airbag 94. The left and right half panel portions 106 and 108 are formed in a horizontal symmetrical shape with a borderline L2 at a center of the inner panel 102. The left and right half panel portions 106 and 108 include front hems 106a and 108a horizontally extending at front ends of the left and right half airbags 92 and 94, upper hems 106b and 108b extending along the upper edges of the left and right half airbags 92 and 94, and lower hems 106c, 108c extending along the lower edges of the left and right half airbags 92 and 94, when the airbag is assembled.

As shown in FIG. 26(b), the outer panel 104 includes a communicating panel portion 110 constituting the commu-nicating part 98 and left and right half panel portions 112, 114. The half panel portions extend to form left and right half portions of the communicating panel portion 110, and constitute surfaces of the left and right half airbags 92 and 94. The inflator opening 100 is provided in the communi-cating panel portion 110.

The outer panel 104 is formed in a horizontally symmetri-cal shape with a central line L3 at a center of the commu-nicating panel portion 110.

The left and right half panel portions 112 and 114 are formed in a symmetrical shape corresponding to the left and right half panel portions 106 and 108 of the inner panel 102. The left and right half panel portions 112 and 114 include front hems 112a and 114a vertically extending at the front ends of the left and right half airbags 92 and 94, upper hems 112b and 114b extending along the upper edges of the left and right half airbags 92 and 94, and lower hems 112c and 114c extending along the lower edges of the left and right half airbags 92 and 94.

In addition, a reinforcing cloth 116 is attached to the communicating panel portion 110 of the outer panel 104 to reinforce the circumferential edge of the hole 100. A refer-ence numeral 118 indicates a joining line in the communi-cating panel portion 110 of the reinforcing cloth 116. Fur-ther, holes 120 are provided around the opening 100 for inserting bolts or the like (not shown), which fix the airbag 90 to a retainer (not shown) of the airbag apparatus, so as to penetrate the reinforcing cloth 116.

As shown in FIGS. 27 and 28, the outer panel 104 is folded along the central line L3 so that the inner surfaces (inner side of the completely manufactured airbag product) of the left and right half panel portions 112 and 114 face each other. The inner panel 102 is folded along the borderline L2 so that the outer surfaces (outer surfaces of the completely manufactured airbag product) of the left and right half portions 106 and 108 face each other. In order for the inner surfaces of the left and right half panel portions 106 and 108 of the inner panel 102 to face the inner surfaces of the panel portions 112 and 114 of the outer panel 104, the inner panel 102 is arranged between the panel portions 112 and 114 of the outer panel 104.

The front hems 106a and 112a, the front hems 108a and 114a, the upper hems 106b and 112b, the upper hems 108b and 114b, the lower hems 106c and 112c, the lower hems 108c and 114c of the respective panel portions 106 and 112 and panel portions 108 and 114 are joined together by sewing or the like. Also, the outer circumferential hems of the communicating panel portions 110 with two panel sheets being folded are joined by sewing or the like. As a result, the bag shaped left and right half airbags 92 and 94 and the communicating part 98 are integrally constructed through the joining process. The joined line is formed continuously along the joining line 122 from the outer circumference of the communicating part 98 around the respective hems of the left and right half airbags 92 and 94.

The tie panel 96 is formed of a pair of tie panel half bodies 96' extending from the front ends of the left and right half airbags 92 and 94. In this embodiment, respective tie panel half bodies 96' extend from the front hems 112a, 114a of the left and right half panel portions 112, 114 of the outer panel 104, and the tie panel half bodies 96' are integrated with the panel portions 112 and 114.

Front end hems 96'a of the tie panel half bodies 96' are overlapped and joined by sewing or the like to thereby connect the front ends of the left and right half airbags 92 and 94. A reference numeral 124 in FIG. 25 indicates a joining line between the front end hems 96'a.

In the above embodiment, also, the left-to-right width W of the tie panel 96 (a gap between the base ends of the respective tie panel half bodies 96' while the tie panel 96 is tightly tensioned) is 200 to 450 mm. Further, an upper edge of the tie panel 96 extends lower than upper edges of the left and right half airbags 92 and 94, and a lower edge of the tie panel 96 is higher than lower edges of the left and right half airbags 92 and 94.

In this airbag 90, a gas emitting port of the inflator (not shown) is arranged inside the communicating part 98 from the inflator opening 100. The gas emitted from the inflator is introduced from both ends of the communicating part 98 into the left and right half airbags 92 and 94. The left and right half airbags 92 and 94 are inflated toward the front, left and right sides of the occupant by the emitted gas.

In the above airbag 90, since the left and right half airbags 92 and 94 are communicated through the communicating part 98, one inflator can inflate the whole airbag 90. Therefore, only one inflator is required for the airbag apparatus, thereby reducing a cost to construct the airbag apparatus.

Other effects of the airbag 90 are identical to those in the respective embodiments of the airbag described above, thereby omitting explanation thereof.

The aforementioned embodiments are examples of the present invention, but the scope of the present invention is not limited to the embodiments described above.

For example, in the embodiments, one tie panel connects only the front ends of the left and right half airbags facing the chest of the occupant. However, the tie panels may be provided at the upper portions of the left and right half airbags facing the head part of the occupant, and at the lower portions of the half airbags facing the abdominal part of the occupant. With such a configuration, the upper and lower tie panels can receive the head and abdominal part of the occupant upon contacting the airbag, thereby significantly reducing the impact on the brain or internal organs of the occupant.

Further, in the airbag of the present invention, the tie panels may be provided at a plurality of portions including the front ends of the left and right half airbags and the upper and lower parts of the portions facing the occupant, or may be selectively provided at any one of those positions. In addition, the tie panels may be provided at occupant facing portions other than those described above. The tie panel may extend successively across the whole area of the occupant facing part, from the upper portion to the lower portion of the occupant facing part.

As described above, according to the present invention, the airbag comprises the left half airbag, the right half airbag, and the tie panel connecting the front ends of the left and right half airbags to securely receive the occupant and sufficiently absorb the impact inflicted to the occupant.

While the invention has been explained with the specific embodiments of the invention, the explanation is illustrative and the invention is limited only by the appended claims.

What is claimed is:

1. An airbag for protecting an occupant in a vehicle, comprising;
   a left half airbag,
   a right half airbag arranged at a right side relative to the left half airbag, said right half airbag contacting the left half airbag when the left and right half airbags are inflated, and
   at least one tie panel connecting the left and right half airbags, said at least one tie panel having a lateral length less than a length of the left and right half airbags in a front-rear direction so that inner side faces of the left and right half airbags contact each other in a plane in a middle area of the front-rear direction upon inflation of the airbag to form a space between the at least one tie panel and a contact point of the inner side faces.

2. An airbag according to claim 1, wherein said left and right half airbags have front sides to face an occupant to be protected when the airbag is inflated, said at least one tie panel being arranged to face the occupant upon inflation of the airbag and fixed to center areas of the front sides of the left and right half airbags to extend therebetween without covering an entire left and right front sides.

3. An airbag according to claim 2, wherein said at least one tie panel connects the left and right half airbags at ends of the front sides when the left and right half airbags are inflated.

4. An airbag according to claim 2, wherein said space formed behind the at least one tie panel between the left and right half airbags absorbs impact applied to the at least one tie panel.

5. An airbag according to claim 2, wherein said left and right half airbags are formed independently.

6. An air bag according to claim 2, wherein said at least one tie panel includes two tie panel sections fixed to the left and right half airbags, respectively, said two tie panel sections being connected together.

7. An airbag according to claim 1, wherein said at least one tie panel between the left and right half airbags has a length of 200 to 450 mm.

8. An airbag according to claim 1, further comprising a communicating part for communicating rear ends of the left and right half airbags with each other.

9. An airbag according to claim 8, wherein said communicating part has one opening for receiving gas to inflate the left and right half airbags.

10. An airbag according to claim 1, wherein said left and right half airbags are arranged relative to left and right sides of an occupant to be protected.

11. An airbag apparatus comprising said airbag according to claim 1 and at least one inflator connected to the airbag.

12. An airbag for protecting an occupant in a vehicle, comprising:
   a left half airbag, a right half airbag arranged at a right side relative to the left half airbag, said right half airbag contacting the left half airbag when the left and right half airbags are inflated, and at least one tie panel connecting the left and right half airbags, said at least one tie panel having a lateral length less than a length of the left and right half airbags in a front-rear direction so that inner side faces of the left and right half airbags contact each other in a plane in a middle area of the front-rear direction upon inflation of the airbag to form a space between the at least one tie panel and a contact point of the inner side faces, wherein said left and right half airbags have front sides to face an occupant to be protected when the airbag is inflated, said at least one tie panel being arranged to face the occupant upon inflation of the airbag and fixed to center areas of the front sides of the left and right half airbags to extend therebetween without covering an entire left and right front sides, and each of said left and right half airbags is formed separately and connected together only by the at least one tie panel.

13. An airbag according to claim 12, wherein each of the left and right half airbags has a hole at a side away from the front sides to receive an inflator therein.

14. An airbag apparatus comprising said airbag according to claim 12, and at least one inflator for inflating the airbag.

* * * * *